US009489832B2

United States Patent
Nair et al.

(10) Patent No.: US 9,489,832 B2
(45) Date of Patent: Nov. 8, 2016

(54) INDUSTRIAL-ENABLED MOBILE DEVICE

(71) Applicant: Rockwell Automation Technologies, Inc., Mayfield Heights, OH (US)

(72) Inventors: Suresh R. Nair, Amherst, NH (US); Burt Sacherski, Nashua, NH (US); Christopher J. Burke, Boxford, MA (US); Derek W. Jones, Galloway (GB); Frederic Boutaud, Lexington, MA (US); Martin Hardegger, Sargans (CH); Rudolf Laurenz Papenbreer, Wuppertal (DE); David M. O'Brien, Andover, MA (US); Kentaro Sugimoto, Medford, MA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 287 days.

(21) Appl. No.: 14/245,762

(22) Filed: Apr. 4, 2014

(65) Prior Publication Data

US 2015/0287318 A1 Oct. 8, 2015

(51) Int. Cl.
*G05B 19/00* (2006.01)
*G08C 17/02* (2006.01)
*G06Q 10/10* (2012.01)

(52) U.S. Cl.
CPC .............. *G08C 17/02* (2013.01); *G06Q 10/10* (2013.01); *G08C 2201/20* (2013.01); *G08C 2201/30* (2013.01); *G08C 2201/61* (2013.01); *G08C 2201/70* (2013.01); *G08C 2201/93* (2013.01)

(58) Field of Classification Search
None
See application file for complete search history.

(56) References Cited

U.S. PATENT DOCUMENTS

| 2005/0007236 A1* | 1/2005 | Lane ................... G06K 19/025 340/5.86 |
| 2005/0073422 A1* | 4/2005 | Graff .................. A47L 15/4293 340/641 |

(Continued)

FOREIGN PATENT DOCUMENTS

EP  1398987  3/2004

OTHER PUBLICATIONS

Extended European Search Report for EP Application Serial No. 15162164.6, dated Aug. 14, 2015, 6 pages.

*Primary Examiner* — Ojiako Nwugo
(74) *Attorney, Agent, or Firm* — Amin, Turocy & Watson, LLP

(57) ABSTRACT

An industrial-enabled mobile electronic device, such as a personal mobile phone or tablet computer, allows a user to wirelessly interact with industrial devices for a variety of purposes. The mobile electronic device can communicate with an industrial device to read and write configuration settings, read and view log data, send commands to the industrial device, and other such functions. The mobile electronic device can perform various types of analysis on images and video of the industrial device captured by the mobile electronic device, including identifying and translating a model or device number printed on the device, or translating error codes displayed by the industrial device. The mobile electronic device can also retrieve additional information about the industrial device or the device's stored data via interaction with a remote technical support service, and can be used to facilitate dialog with a remote technical support person.

20 Claims, 21 Drawing Sheets

(56) References Cited

U.S. PATENT DOCUMENTS

| | | | |
|---|---|---|---|
| 2009/0167483 A1* | 7/2009 | Jones | H05B 37/029 340/3.7 |
| 2013/0024542 A1 | 1/2013 | Keller et al. | |
| 2014/0170969 A1* | 6/2014 | DeVos | G06F 17/30 455/41.1 |
| 2014/0250183 A1* | 9/2014 | Unagami | H04M 3/5166 709/204 |

* cited by examiner

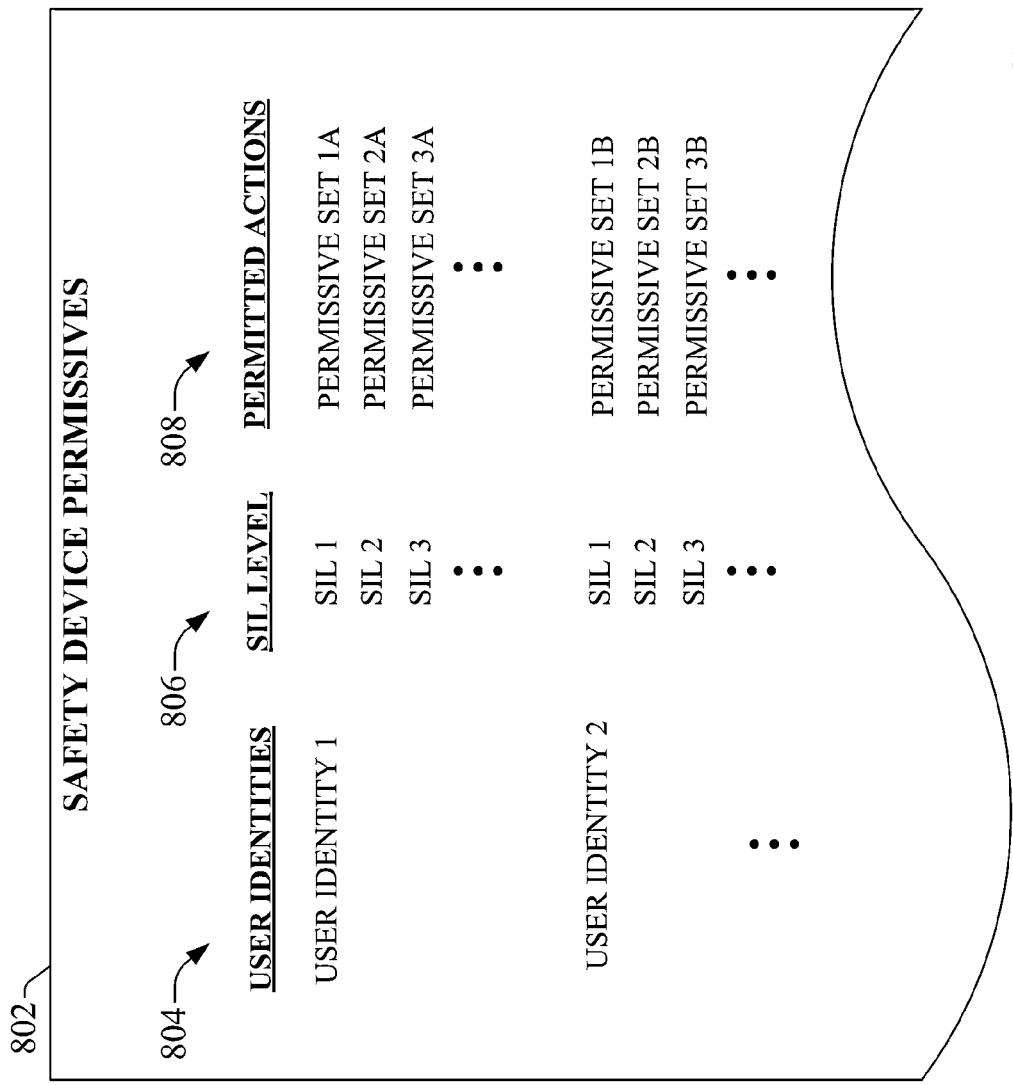

INDUSTRIAL-ENABLED MOBILE DEVICE

TECHNICAL FIELD

The subject application relates generally to industrial automation, and, more particularly, to an industrial-enabled mobile personal device that can facilitate wireless interaction between a user and an industrial device.

BACKGROUND

Industrial controllers and their associated I/O devices are central to the operation of modem automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures. In general, industrial controllers read input data from sensors and metering devices that provide discreet and telemetric data regarding one or more states of the controlled system, and generate control outputs based on these inputs in accordance with the user-defined program.

In addition to industrial controllers and their associated I/O devices, some industrial automation systems may also include low-level control systems, such as vision systems, barcode marking systems, variable frequency drives, industrial robots, and the like which perform local control of portions of the industrial process, or which have their own localized control systems.

Human interaction with these disparate industrial devices—including but not limited to installation, and configuration of the devices, identification of the devices' visual indicators, device calibration, diagnostics, retrieval and translation of log data stored on the devices, and other such interactions—often requires the user to be sufficiently near the device to allow the user to visually inspect the device, manually adjust a configuration parameter or mode setting (e.g., by actuating a button or dial on the device), or to plug a physical cable to the device to facilitate communication between the device and a portable computer (e.g., a laptop computer). This requirement restricts the possible installation locations for such devices, since the choice of installation location must allow for these types of maintenance access.

Moreover, installation, maintenance, and diagnostics of these industrial devices often require plant maintenance or engineering personnel to refer to the devices' documentation (e.g., user manuals, installation guides, etc.) or to contact remote technical support entities in order to identify the device, interpret error codes, translate logged data stored on the device, or other such device interactions. However, device documentation may not be readily available to plant personnel when needed, particularly if the user is investigating a maintenance issue on the plant floor. In such scenarios, the user may be located at the site of the problem (e.g., physically proximate to the device), but the documentation for the device may be located elsewhere in the plant (e.g., in the engineering office), or may be missing altogether.

If the user wishes to contact remote technical support personnel to assist in diagnosing a performance issue with an industrial device, the user must first locate the contact information for the remote support office. Once in contact with remote support personnel, the user must then provide information about the device and the problem to be solved, which may include identifying the device, interpreting visual indicators rendered by the device, describing the device's recent operation, etc. However, these interactions between the end user and the technical support staff may require a degree of knowledge about the device that the end user does not possess.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to the use of mobile personal electronic devices—e.g., smart phones, tablet computers, and the like —in connection with documenting, installing, calibrating, and diagnosing industrial automation devices. To this end, one or more industry-specific applications can be installed on a mobile electronic personal device, thereby enabling the mobile device to interact with one or more industrial devices (e.g., industrial controllers, sensors opto-electronic devices, safety relays or other safety automation components, etc.) to carry out a variety of industrial functions. The industry-specific applications can leverage one or more peripherals of the mobile device—including but not limited to the mobile device's camera, microphone, wireless interface, biometrics reader, display screen, position detection systems (e.g., global positioning systems) etc.—to capture or retrieve information about an industrial device or information stored thereon, and to process this information assist the user in connection with identifying the industrial device, discovering information about the industrial device, sending instructions to the industrial device via the mobile device, configuring the industrial device, or other such functions.

According to various embodiments, a mobile device running an industry-specific application can capture a photograph or video of an industrial device and translate error codes or LED blinking sequences rendered by the industrial device based on the photograph or video, identify the industrial device based on the photograph or video, and/or retrieve relevant device documentation from a remote knowledgebase based on the photograph or video.

In some embodiments, the industry-enabled mobile device may also be used to write data or send command signals to the industrial device via the mobile device's wireless interface (e.g., Bluetooth, near field communication (NFC), or other such wireless interface). In such embodiments, the industry-enabled mobile device can enforce role-based read/write privileges for selected industrial devices using the mobile device's user recognition functionality, including, but not limited to, biometric or password-based verification. This ensures that only verified authorized personnel (e.g., maintenance or engineering personnel) are permitted to read and write information to the industrial device via the mobile device.

Some embodiments of the industrial-enabled mobile device can also simplify and automate interactions between plant personnel and remote technical support services. This can include, for example, automated retrieval of relevant technical support documentation from a web-based or cloud-based knowledgebase based on information about the industrial device collected by the mobile device, or routing the captured device information to a web-based or cloud-based diagnostic service capable of analyzing the device data and delivering configuration or diagnostic recommendations to the mobile device. In some embodiments, the mobile device can present these diagnostic features to the user in the form of a troubleshooting wizard that guides the user through a series of checks and/or operations to yield a solution to a device performance issue. In another example, the industry-enabled mobile device can collect relevant information about the industrial device (e.g., via the mobile device's camera and/or wireless interface) and route the collected data to suitable remote technical support personnel capable of assisting the end user with installation or troubleshooting of the industrial device. The industry-enabled mobile device can subsequently facilitate dialog between the end user and the technical support personnel.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 8 illustrates an example file format for storing SIL-specific permissives.

DETAILED DESCRIPTION

Figure 1:
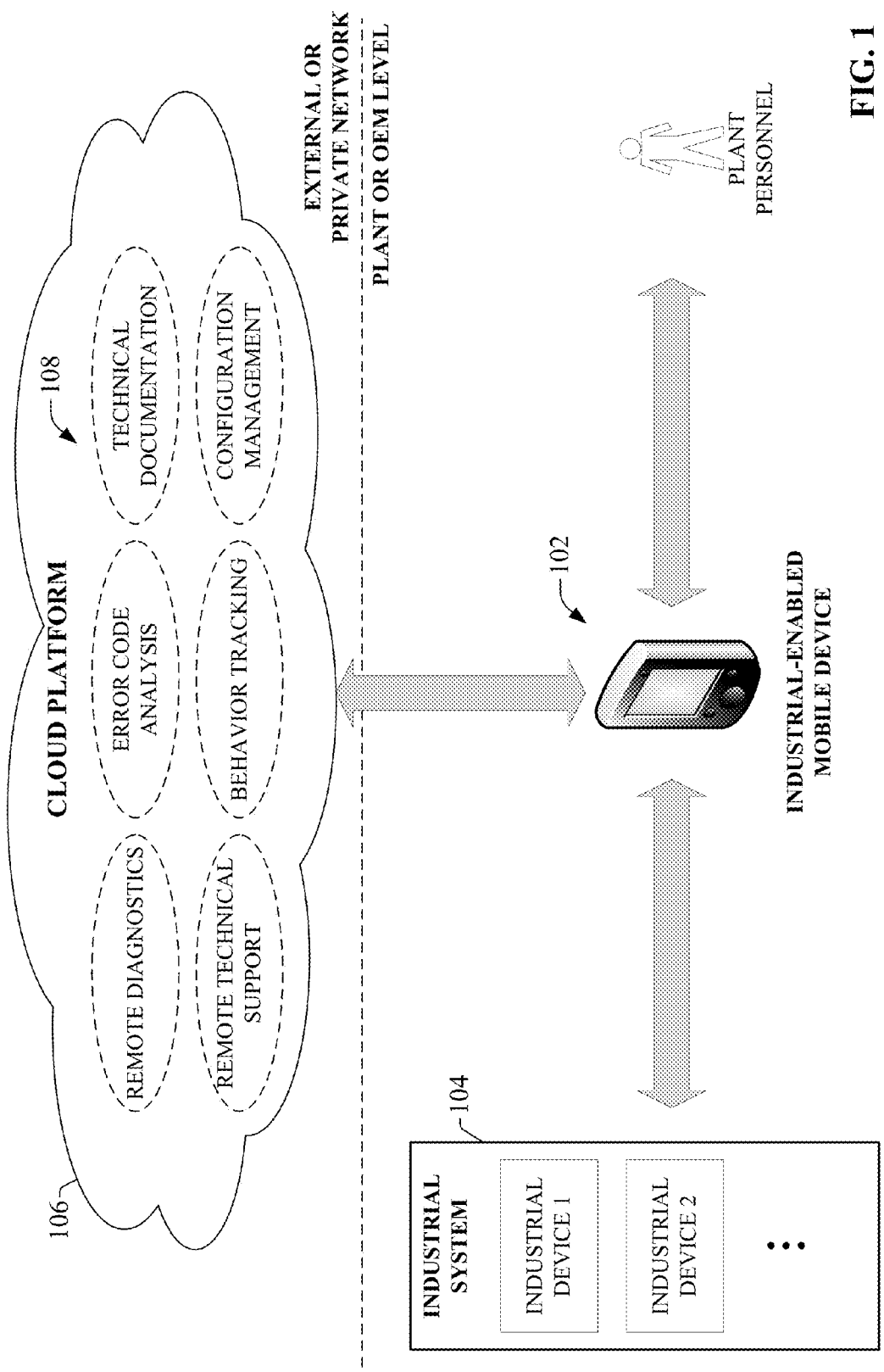
FIG. 1 illustrates interactions between a user, an industrial system comprising one or more industrial devices, and a cloud platform facilitated by an industrial-enabled mobile device according to one or more embodiments.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a general overview depicting interactions between a user, an industrial system comprising one or more industrial devices, and a cloud platform facilitated by an industrial-enabled mobile device according to one or more embodiments. Industrial-enabled mobile device 102 may comprise any suitable mobile electronic personal device, including but not limited to a mobile phone, a tablet computer, or other such consumer electronic device. Industrial-enabled mobile device 102 may include a number of input peripherals (e.g., a camera with photographic and video capability, a microphone, a touch screen, a keyboard, a biometrics reader etc.) and output peripherals (e.g., a display screen, a speaker, etc.). Industrial-enabled mobile device can also include one or more wireless interface capabilities, including but not limited to Bluetooth, near field communication (NFC), 4G, WiFi, etc.

Industrial-enabled mobile device 102 comprises a processor (e.g., a microprocessor, such as a multi-core processor) whose operation is controlled, in part, by information stored in the device's memory. This information can include operating system software, application software (e.g., one or more industry-specific applications installed on the device 102), configuration data, or other such information.

Industrial system 104 comprises a number of industrial devices that operate together to control an industrial process or automate one or more industrial machines. Example industrial systems can include, but are not limited to, batch control systems (e.g., mixing systems), continuous control systems (e.g., PID control systems), or discrete control systems. The industrial devices that make up industrial system 104 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Example industrial systems can include one or more industrial controllers that facilitate monitoring and control of their respective processes. The controllers exchange data with the field devices using native hardwired I/O or via a plant network such as Ethernet, EtherNet/IP, Data Highway Plus, ControlNet, DeviceNet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

The industrial devices comprising industrial system 104 may reside in fixed-location industrial facilities, or may be part of a mobile control and/or monitoring application, such as a system contained in a truck or other service vehicle.

Industrial-enabled mobile device 102 can be configured to collect and process data, in a variety of formats, from one or more industrial devices comprising industrial system 104, and to provide useful outputs to the owner of the mobile device 102 relating to the identification, function, status, and health of the industrial devices. Mobile device 102 can also be configured to write configuration data, calibration data, or commands to the industrial devices in accordance with input instructions from the user, subject to biometrically enforced user authentication.

In some embodiments, industrial-enabled mobile device 102 can process the collected industrial device data locally in accordance with application instructions installed on the mobile device. In addition or alternatively, industrial-enabled mobile device 102 can interact with web-based or cloud-based remote services 108 to facilitate remote processing of the industrial device data. In such embodiments, industry-enabled mobile device 102 serves as an interface point between the industrial system 104, the user, and the remote services 108 residing on cloud platform 106. In this regard, some embodiments of industrial-enabled mobile device 102 can be configured to discover and interact with the remote services 108 hosted by cloud platform 106. Cloud platform 106 can be any infrastructure that allows remote services 108 to be accessed and utilized by cloud-capable devices. Cloud platform 106 can be a public cloud accessible via the Internet by devices having Internet connectivity and appropriate authorizations to utilize the remote services 108. In some scenarios, cloud platform 106 can be provided by a cloud provider as a platform-as-a-service (PaaS), and the remote services 108 can reside and execute on the cloud platform 106 as a cloud-based service. In some such configurations, access to the cloud platform 106 and associated remote services 108 can be provided to customers as a subscription service by an owner of the remote services 108. Alternatively, cloud platform 106 can be a private cloud operated internally by an industrial enterprise that owns industrial system 104. An example private cloud platform can comprise a set of servers hosting the remote services 108 and residing on a corporate network protected by a firewall.

Services 108 can include, but are not limited to, remote diagnostics, error code analysis, technical documentation storage, remote technical support, device or system behavior tracking, device configuration management, or other such services. These services will be described in more detail herein. Although FIG. 1 depicts these services as remote services hosted on a cloud platform 106, one or more of the services described herein can be performed locally on industry-enabled mobile device 102 in some embodiments.

In one or more embodiments, an industrial mobile application can be provided that, when installed on a user's mobile personal device (e.g., mobile phone, tablet, smart glasses or other type of wearable computer, etc.), enables the mobile device to interact with one or more industrial devices and process data captured from the industrial devices by the mobile device, and/or to render output to the user based on data captured from the industrial devices. In other embodiments, industrial-enabled mobile device 102 can be provided as a pre-configured mobile device capable of performing these functions.

Figure 2:
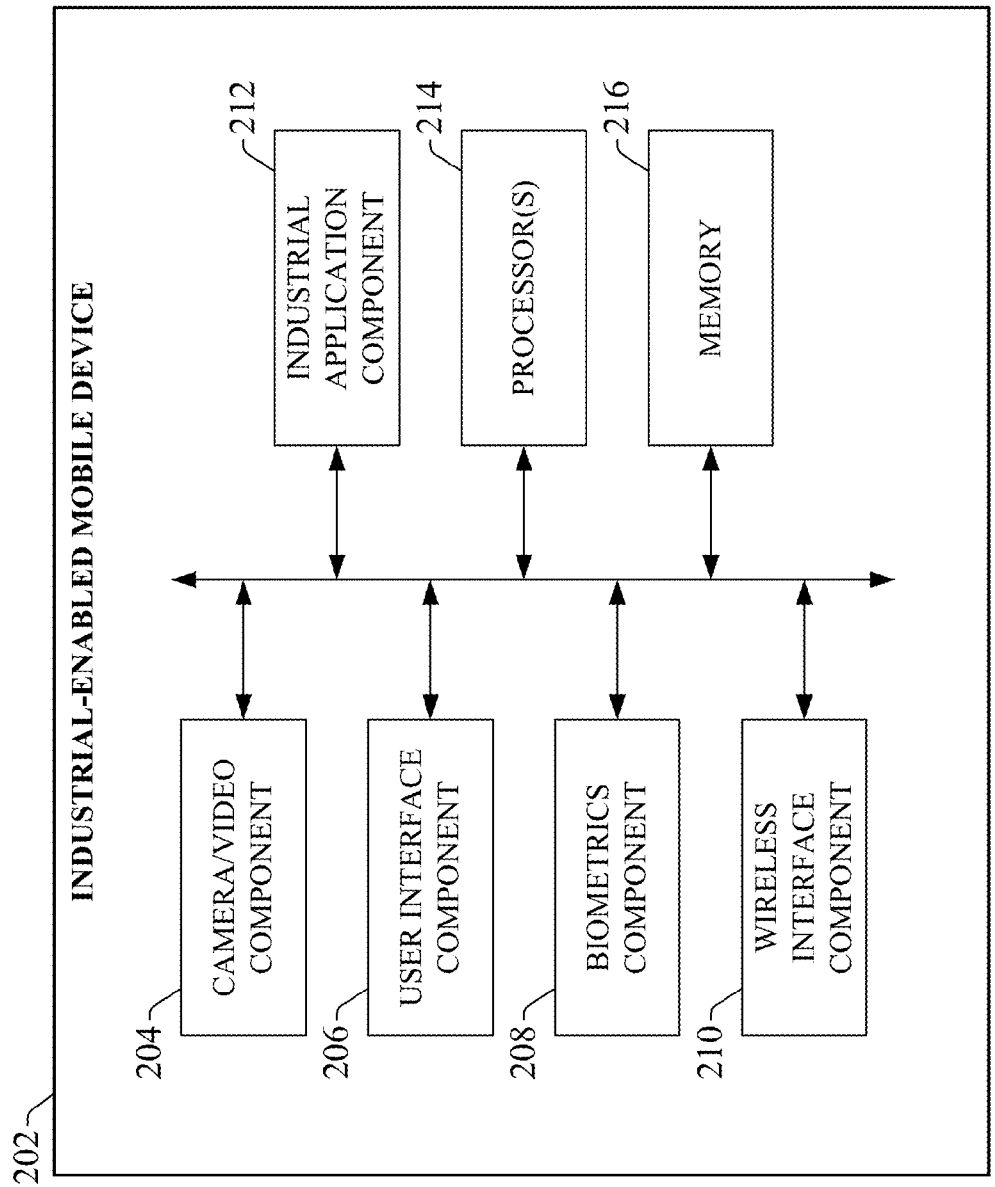
FIG. 2 is a block diagram of an example industrial-enabled mobile device.

FIG. 2 is a block diagram of an example industrial-enabled mobile device 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial-enabled mobile device 202 can include one or more of a camera/video component 204, a user interface component 206, a biometrics component 208, a wireless interface component 210, an industrial application component 212, one or more processors 214, and memory 216. In various embodiments, one or more of the camera/video component 204, user interface component 206, biometrics component 208, wireless interface component 210, industrial application component 212, the one or more processors 214, and memory 216 can be electrically and/or communicatively coupled to one another to perform one or more of the functions of the industrial-enabled mobile device 202. In some embodiments, components 204, 206, 208, 210, and 212 can comprise software instructions stored on memory 216 and executed by processor(s) 214. Industrial-enabled mobile device 202 may also interact with other hardware and/or software components not depicted in FIG. 2. For example, processor(s) 214 may interact with one or more external user interface devices, such as a keyboard, a mouse, a display monitor, a touchscreen, or other such interface devices.

Camera/video component 204 can be configured to capture photographic image or video data via a camera lens built into the mobile device 202. Camera/video component 204 can also include a microphone to capture sound data concurrently with the video data. Camera/video component 204 can convert analog signals received via the mobile device's camera and/or microphone into digital data suitable for processing by the system.

User interface component 206 can be configured to receive user input and to render output to the user in any suitable format (e.g., visual, audio, tactile, etc.). Biometrics component 208 can be configured to read biometric data from an owner of mobile device 202 (e.g., a fingerprint or retina scan, a facial image, etc.) and cross-reference the biometric data with a user identity. Some features of industrial-enabled mobile device 202 may only be permitted upon confirming that biometric data provided by the possessor of the mobile device is associated with a user identity having suitable authorization to execute the requested feature. Wireless interface component 210 can be configured to connect the industrial-enabled mobile device 202 to a wireless network or to establish wireless communication (e.g., near field communication, WiFi, Bluetooth, etc.) with another device having wireless communication capability.

Industrial application component 212 can be configured to execute on the industrial-enabled mobile device 202 to facilitate wireless interaction with one or more industrial devices (e.g., industrial controllers, sensors, telemetry devices, safety relays, etc.), and leverage the mobile device's memory and processing capabilities to process data captured or collected from the industrial devices. Industrial application component 212 can be, for example, a specialized software application that can be installed on a user's personal mobile electronic device, thereby enabling the mobile electronic device to carry out the industrial functions to be described in more detail herein. A variety of industrial application components 212 can be provided, each designed to carry out one or more of the industrial functions described herein.

The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
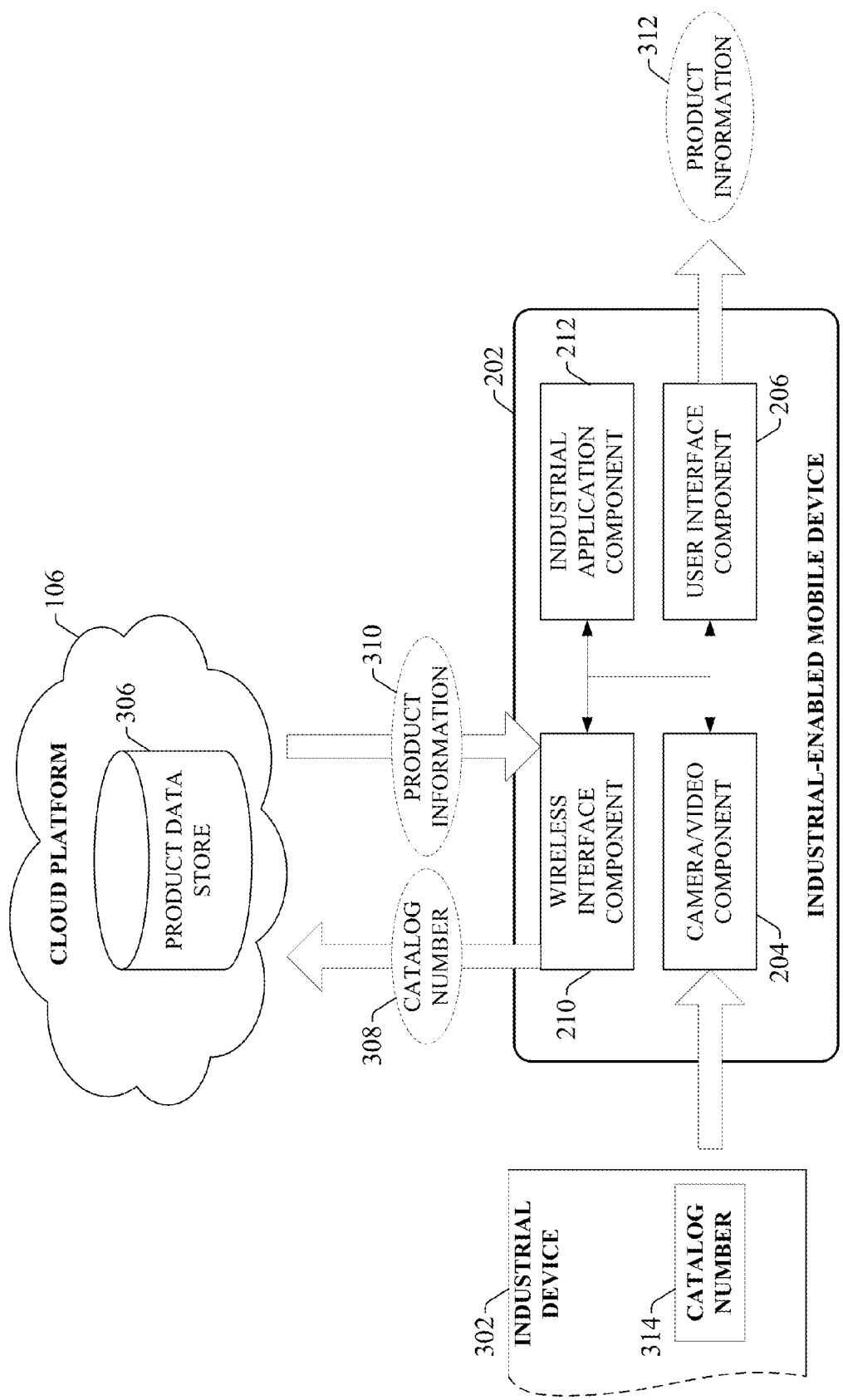
FIG. 3 illustrates an embodiment of an industrial-enabled mobile device capable of identifying an industrial device using photographic data.

FIG. 3 illustrates an embodiment of an industrial-enabled mobile device capable of identifying an industrial device using photographic data. In this example, industrial device 302 (e.g., an industrial controller, a safety relay, a sensor, a motor drive, etc.) has a catalog number 314 visible on a surface of the device. In some scenarios, catalog number 314 may comprise printed, raised, or embossed characters spelling the name or model number of the industrial device 302. Catalog number 314 may also comprise quick response (QR) code or other machine-translatable code printed on a surface of the industrial device 302.

In this example, industrial-enabled mobile device 202 can be used to take a photograph or video of the catalog number 314 on industrial device 302. The mobile device 202 can then locate the catalog number 314 within the photograph or image data, translate the catalog number 314 to determine the identity of the industrial device 302, and retrieve relevant information about the industrial device 302 for display via the mobile device's display screen.

Accordingly, the mobile device's camera/video component 204 can capture an image or video of the portion of the industrial device 302 on which the catalog number 314 is located (typically the front face of the industrial device 302, although the catalog number 314 may be located elsewhere on the device). Industrial application component 212 is configured to recognize the portion of the image or video data containing the catalog number 314, and to extract the catalog number from the image or video. In the case of a human-readable or alphanumeric catalog number, industrial application component 212 may perform optical character recognition on the image in order to identify the catalog number. For QR codes or other machine-translatable codes, industrial application component 212 can perform a suitable translation on the code in order to obtain the identity of the industrial device 302.

Once the catalog number 302 has been identified, industrial application component 212 can submit the translated catalog number 302 to a product data store that maintains product information for multiple industrial devices, organized according to catalog number. In some embodiments, this product data store can be maintained by the industrial application component 212 on the mobile device's local memory (e.g., memory 216 of FIG. 2). Accordingly, once the catalog number has been identified, industrial application component 212 can access this local data store and retrieve the relevant information about the identified industrial device 302. This information can include, for example, a name of the industrial device 302, a function of the industrial device 302, product documentation (e.g., installation guide, user's guides, troubleshooting guides, links to websites containing additional information about the identified industrial device 302, etc.), contact information for technical support entities who may be qualified to provide support for the identified industrial device 302, or other such information. The product information may also include an indication of whether other software applications (e.g., other downloadable mobile device applications) specific to the identified industrial device 302 are available for download. In another example, the product information may comprise recommended configuration settings for the industrial device 302, which can then be downloaded to the industrial device 302 using mobile device 202, according to techniques described in more detail below.

Once the product information has been retrieved, industrial application component 212 can then leverage the user interface component 206 to render the retrieved product information 312 on a display screen of the mobile device. For embodiments in which the product data store is maintained locally on the industrial-enabled mobile device 202, the industrial application component 212 may update the product data store based on updated product information received from a remote source (e.g., a vendor associated with the industrial device 302) via wireless interface component 210.

In another embodiment, the product data store may be maintained remotely, e.g., on a remote cloud platform 106 or other remote location. In such embodiments, after industrial application component 212 has read and translated catalog number 314 from the industrial device 302 locally at the mobile device, the industrial application component 212 can then submit the catalog number 308 to the remote product data store 306 residing on cloud platform 106 via wireless interface component 210. Data retrieval services executing on cloud platform 106 can then retrieve the relevant product information corresponding to the catalog number 308 from product data store 306, and return the product information 310 to the mobile device 202. Industrial application component 212 can then render the retrieved product information 312 on the mobile device's display screen. In such embodiments wherein the mobile device 202 interfaces with a cloud platform 106 to retrieve relevant product information, the industrial application component 212 can be pre-configured with information required to discover and interact with the appropriate services on cloud platform 106 (e.g., a uniform resource locator (URL) identifying the cloud platform 106, identification of the necessary cloud-based services to which the extracted catalog number should be sent, etc.).

In some embodiments, industrial application component 212 and product data store 306 can be configured to identify a possible replacement device that can be used in place of the identified industrial device 302. This can include identification of similar or equivalent devices available from the same vendor or supplier of industrial device 302, or identification of a similar or equivalent device available from a different vendor. According to such embodiments, product data store 306 may cross-reference similar or equivalent devices across different vendors, and identify one or more suitable replacement devices for industrial device 302 based on this cross-referenced information. In an example application of this feature, a given plant facility may comprise multiple industrial automation systems, each comprising multiple industrial devices (e.g., controllers, sensors, drives, etc.) provided by a variety of different product vendors. Plant personnel wishing to standardize their plant floor devices under a single preferred product vendor can use industrial-enabled mobile device 202 to identify equivalent replacement devices offered by the preferred vendor for each of their existing devices. These equivalent devices can be identified by taking a photograph of the existing industrial device using the mobile device's integrated camera, and instructing the industrial application component 212 to identify suitable vendor-specific replacement devices and association product information from product data store 306. The industrial application component 212 can render a list of equivalent devices on the mobile device's display screen via user interface component 206. In some embodiments, industrial application component 212 can also display ordering information to simplify or automate the process of ordering the identified replacement devices (e.g., web links, click-toorder graphical buttons, contact information for local suppliers who carry the replacement device, etc.).

In some embodiments, the industrial-enabled mobile device 202 can be configured to identify the industrial device 302 based on other distinctive physical attributes of the industrial device, which can be identified by analyzing the image or video data of the device. In this regard, industrial application component 212 may be configured to recognize certain distinctive physical features that characterize respective models of industrial devices. Accordingly, the industrial application component 212 can analyze the image or video of the industrial device 302, isolate and identify these distinctive physical attributes, and identify the industrial device based on stored information that cross-references a variety of physical features with their corresponding industrial devices. Industrial application component 212 can then retrieve corresponding product documentation or identify suitable replacement devices as described in previous examples.

Figure 4:
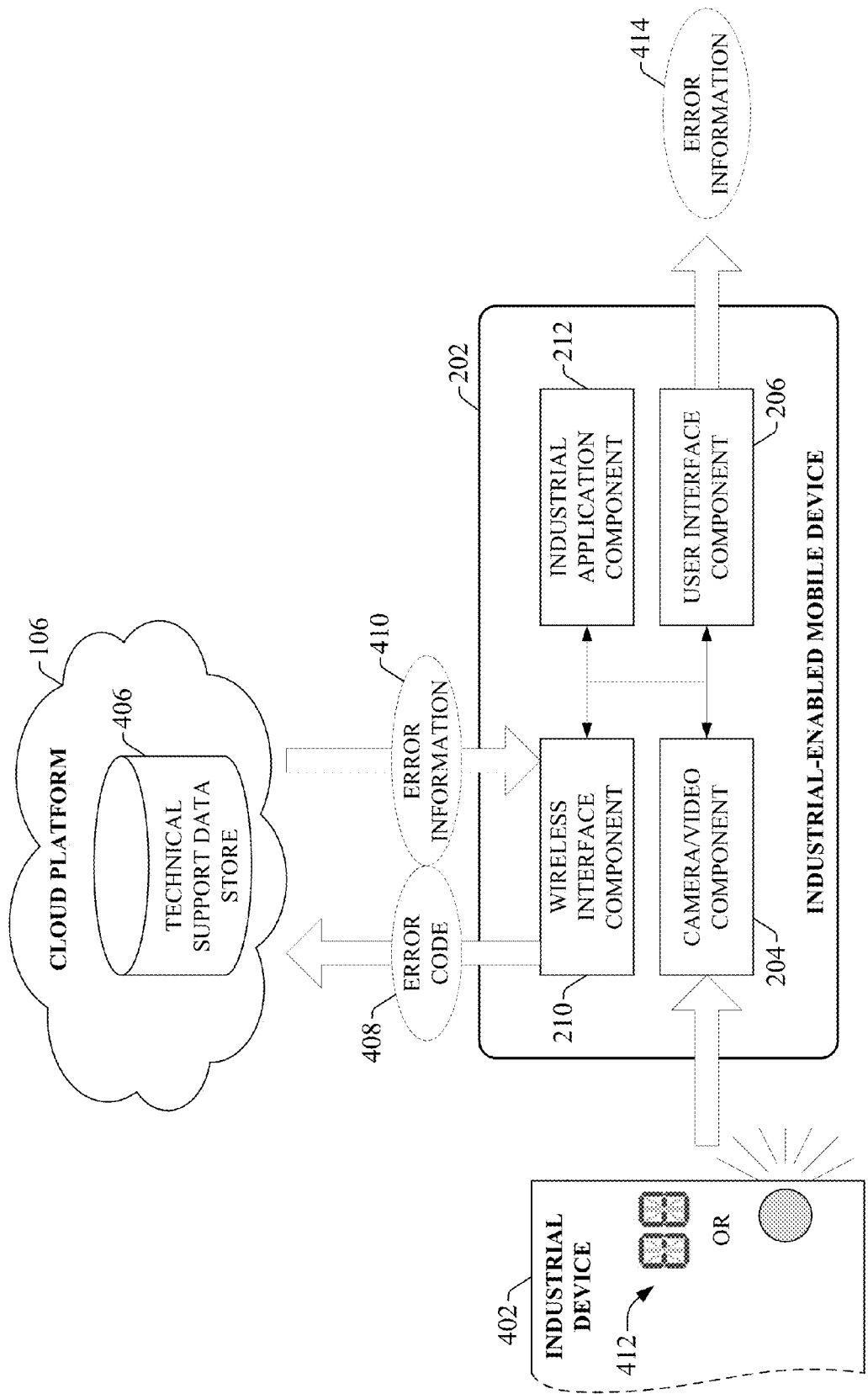
FIG. 4 illustrates an embodiment of an industrial-enabled mobile device capable of translating error codes displayed on an industrial device.

FIG. 4 illustrates an embodiment of an industrial-enabled mobile device capable of translating error codes displayed on an industrial device. In this example, industrial device 402 (e.g., an industrial controller, a safety relay, a sensor, a motor drive, etc.) has an integrated error display 412 located on its front face. Error display may be, for example, an alphanumeric display (e.g., a seven-segment display) that renders a numeric or alphanumeric code corresponding to a current error condition of the industrial device. Alternatively, error display 412 may comprise one or more light emitting diodes (LEDs) that blink according to a particular blinking sequence, where the blinking sequence corresponds to the current error condition. In this regard, industrial device 402 may be configured to recognize multiple error conditions (e.g., over current, ground fault, over heat, program fault, low voltage, etc.), and each error condition is associated with a particular alphanumeric error code (if a seven-segment display is used) or a particular blinking sequence (if an LED is used).

In this example, industrial-enabled mobile device 202 can be used to take a photograph or video of the displayed error code or blinking sequence, and the mobile device 202 can identify the error associated with the error code or blinking sequence based on the image or video. The mobile device 202 can then display information about the error, including possible corrective measures that can be taken to correct or clear the error condition.

Accordingly, the mobile device's camera/video component 204 can capture the image or video of the portion of the industrial device 402 on which the error display 412 is located (typically the front face of the industrial device 402, although error display 412 may be located elsewhere on the device). In this example, industrial application component 212 is configured to recognize the portion of the image or video data containing the error code or blinking sequence, and extract the error code or blinking sequence information from the image or video. In the case of a seven-segment error code or other type of alphanumeric code, industrial application component 212 may perform optical character recognition on the error code image in order to identify the error code. For the blinking sequence, industrial application component 212 can perform analysis on the video recording of the blinking LED to identify the distinctive blinking sequence captured in the video.

Once the error code or blinking sequence has been identified, industrial application component 212 can cross-reference the error code or blinking sequence with the corresponding error, and retrieve information about the error based on the error code and the particular model of the industrial device 402. Since the error corresponding to the error code or blinking sequence will often depend on the model number or type of the industrial device 402, industrial application component 212 can be configured to identify the error based on the identified error code or blinking sequence as well as the model number (or other identifier) for the industrial device 402 being examined. In some scenarios, the model number or identifier for the industrial device 402 can also be determined based on analysis of the image or video data, as described above in connection with FIG. 2. Alternatively, the model number or identity of industrial device 402 can be entered manually by the user via user interface component 206. For example, industrial application component 212 may render a graphical display on the mobile device's display screen prompting the user to enter the model number or identity of industrial device 402. In some embodiments, industrial application component 212 may maintain a database of supported industrial devices on the mobile device's local memory, and allow the user to select the industrial device from a list of these supported devices rendered on the display screen. The industrial application component 212 may update this database of supported industrial devices based on an updated list of supported industrial devices received from a remote source (e.g., a vendor associated with the industrial device 402) via wireless interface component 210.

In some embodiments, industrial-enabled mobile device 202 can maintain local error code information for multiple different error codes, across multiple different industrial devices. For example, this error code information may be stored on the mobile device's local memory (e.g., memory 216) upon installation of industrial application component 212. Accordingly, industrial application component 212 can access this locally stored error code data and select the appropriate subset of error information corresponding to the identified error code and the industrial device identifier. This error information 414 can then be rendered on the mobile device's display screen via the user interface component 206. Error information 414 can comprise, for example, an explanation of the error or fault corresponding to the error code, instructions on how to clear the error or fault, possible causes of the fault, one or more countermeasures for mitigating future occurrences of the error or fault, or other relevant information.

In other embodiments, the error code information can be stored remotely, e.g., in a technical support data store 406 maintained on cloud platform 106. As with the product data store 306 described above in connection with FIG. 3, the industrial-enabled mobile device 202 can access remote technical support data store 406 via an Internet connection using wireless interface component 210. Industrial application component 212 can extract and translate the error code rendered by error display 412 as described above, and submit the error code 408 and industrial device identifier to the technical support data store 406 via wireless interface component 210. Search and retrieval services executing on cloud platform 106 can retrieve the error information 410 corresponding to the error code 408 and device identifier, and deliver the error information 410 to the mobile device 202 for display on the device's display screen.

Figure 5:
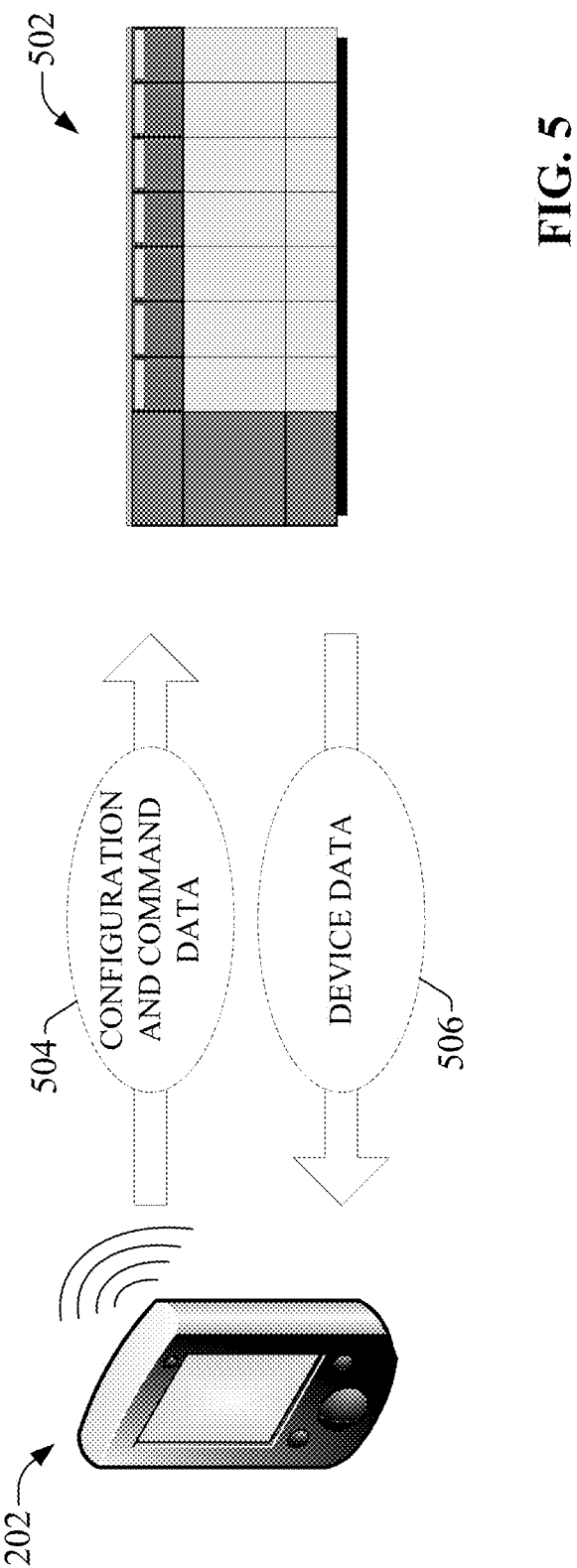
FIG. 5 illustrates data read and write functions carried out between an industrial-enabled mobile device and an industrial device.

In addition to reading and translating images and video of industrial devices as described above, some embodiments of the industrial-enabled mobile device can write data or commands to certain types of industrial devices, as well as read stored configuration, status, or log data from the industrial devices. FIG. 5 illustrates data read and write functions carried out between an industrial-enabled mobile device 202 and an industrial device 502. In this example, industrial device 502 is depicted as an industrial controller (e.g., a programmable logic controller). However, embodiments of industrial-enabled mobile device described herein can exchange data with other types of industrial devices, including but not limited to telemetry devices, sensors, safety relays, motor drives, vision systems, industrial cameras, and the like.

In some embodiments, industrial-enabled mobile device can establish communication with industrial device 502 over a wireless connection (e.g., Bluetooth, near field communication (NFC), WiFi, etc.) in response to an instruction from the owner of the mobile device 202. In such scenarios, industrial device 502 may include its own wireless interface to facilitate communication and data exchange with other devices. In order to ensure that only authorize personnel are permitted to wirelessly connect to the industrial device 502, industrial application component 212 executing on mobile device 202 may leverage the mobile device's integrated biometric functions (e.g., biometrics component 208 of FIG. 2) or other integrated user authentication features of the mobile device to ensure that the owner of the mobile device 202 is suitably authorized to send commands to and/or read data from industrial device 502. For example, the industrial application component executing on industrial-enabled mobile device 202 may be configured to enable read/write privileges with industrial device 502 only after the user has passed a biometric confirmation (e.g., a fingerprint scan, a retina scan, a facial recognition check, etc.), where the user's biometric data is received via the mobile device's biometrics component 208. Once the user's biometric information has been confirmed, the industrial application component can initiate wireless communication with the industrial device 502. Alternatively, the user's identity may be confirmed via password authentication.

In another example, the degree of access to industrial device 502 may depend on a role associated with the owner of mobile device 202. Accordingly, either the mobile device 202 or the industrial device 502 may store the identities of all authorized personnel having some degree of permitted access to industrial device 502, as well as each authorized person's role (e.g., operator, maintenance, engineer, finance, etc.) or explicit degree of allowed access. When the owner of mobile device 202 attempts to initiate communication between mobile device 202 and industrial device 502, the mobile device 202 prompts the user for biometric information. If the personnel data is maintained locally on mobile device 202, the industrial application component executing on the mobile device can identify the user based on the provided biometric information, determine the user's role and associated degree of access, and enable only those read/write features granted to the user's role. For example, some users may only be permitted to read log data stored on industrial device, while others may additionally be permitted to write or make changes to the industrial device's stored configuration settings via mobile device 202.

The degree of access to a particular industrial device may depend on the type of industrial device for which access is requested. For example, the read/write privileges for safety devices (e.g., safety relays) may be limited such that only users defined as having an engineering role are permitted to make changes to the safety device's configuration settings via mobile device 202, whereas non-safety devices may be defined to allow write privileges to both engineering and maintenance users. In another example, a broader range of users may be permitted to access sensors or telemetry devices relative to users allowed to access industrial controllers via mobile device 202. Since the user's degree of permitted access may be device-specific, the industrial application component executing on mobile device 202 may first identify the industrial device 502 (e.g., by polling the industrial device 502 for device identification information over the wireless connection), then determine the user's read/write privileges to that particular industrial device based on the stored permission data.

In other scenarios, the user privilege information may be stored on the industrial device itself. In such scenarios, the industrial-enabled mobile device 202 may receive a command from the owner of the mobile device to read information from, or write data to, industrial device 502 (e.g., via a graphical display generated by the industrial application component 212). The mobile device 202 can send this request to the industrial device 502 over the wireless connection, together with the user's identification information (authenticated by the mobile device 202 using biometric confirmation). Upon receipt of this data, the industrial device 502 can access the stored permission data to determine whether sufficient read/write privileges have been associated with the user identification to permit the requested action. If the industrial device 502 determines that the identified user is not permitted to perform the requested action, the industrial device 502 may return a denial indication to the mobile device 202, causing the industrial application component 212 to render an appropriate message on the mobile device's display screen indicating that the action cannot be completed.

Contingent on the read/write permission described above, industrial-enabled mobile device 202 can be used to write configuration and command data 504 to the industrial device. This can include, for example, modifying one or more configuration parameters on the industrial device 502 through interaction with a specialized graphical interface generated by the industrial application component 212 and rendered on the mobile device's display screen. In some scenarios, configuration parameters can be modified manually by selecting a desired parameter on the mobile device's display screen and entering a new value for the parameter, which is then downloaded to the industrial device 502 by the mobile device 202. Alternatively, mobile device 202 may download a set of recommended configuration settings for the industrial device 502 from a remote source (e.g., a remote web-based or cloud-based product knowledgebase containing recommended parameter settings for various industrial devices, where such recommended parameter settings may be a function of the type of industrial application in which the industrial device 502 is being used). The mobile device 202 can then write the downloaded configuration settings to the industrial device 502.

In another example, the industrial-enabled mobile device 202 can be used to remotely place the industrial device 502 in a desired operating mode without the need to physically touch the device. For example, a user may place an optosensor in a Teach mode by wirelessly connecting to the sensor using the mobile device 202 and switching the mode through interaction with a suitable graphical interface generated by the industrial application component 212 and rendered on the mobile device's display screen. Mobile device 202 can also be used to remotely clear a fault condition on the industrial device 502 by writing a Clear Fault command to the industrial device via the mobile device's wireless interface component (in response to user interaction with a graphical interface generated by the industrial application component and rendered on the mobile device's display screen).

Since the user's identity is verified prior to allowing new configuration data to be written to industrial device 502— either biometrically or by virtue of a user identity associated with a password-protected mobile device—the industrial-enabled mobile device 202 can facilitate tracking of all configuration modifications made to industrial device 502. For example, each time a configuration change is made to industrial device 502 by an industrial-enabled mobile device, the mobile device can send a record of the modification, as well as the biometrically authenticated identity of the owner of the mobile device, to a higher level tracking system residing in the plant, or to a remote tracking application executing on cloud platform 106. Such tracking systems can use this data to create a log of configuration modifications made to industrial device 502, including the nature of the modifications (e.g., which configuration parameters were modified, the valves of the parameter settings before and after the change, etc.), a time of the modification, and an identity of the user who performed the change.

Contingent on the user's read privileges, industrial-enabled mobile device 202 can also be used to view and/or retrieve device data 506 stored on the industrial device 502. In some scenarios, the device data 506 may comprise configuration parameters for the industrial device 502. For example, if the industrial device 502 is a variable frequency drive (VFD), industrial-enabled mobile device 202 may be configured to establish wireless communication (e.g., NFC, Bluetooth, etc.) with the VFD and poll the VFD for its current configuration settings (e.g., acceleration and deceleration times, deceleration time, frequency bias, torque limit, etc.). Since the range of configuration parameters available to be viewed depends on the particular industrial device being examined, the industrial application component 212 executing on the mobile device 202 may initially identify the type or model of industrial device 502, e.g., by polling the industrial device for identification information, or using the photographic analysis discussed above in connection with FIG. 3. Based on the determined identity of the device, industrial application component 212 can then generate a suitable graphical display for viewing the configuration parameters and settings known to be available on that particular industrial device. Depending on the user's biometrically confirmed (or password confirmed) read/write privileges for the identified industrial device, the industrial application component 212 can also allow selected configuration parameters to be modified via the mobile device 202 through interaction with the graphical interface, allowing suitably authorized personnel to write new configuration settings to industrial device 502 without the need to touch the device or to physically connect a separate laptop computer to the industrial device. Thus, industrial-enabled mobile device 202 allows greater freedom with regard to selection of a suitable installation location for industrial devices, since industrial devices that require configuration modifications after installation need not be limited to locations that allow for physical maintenance access to the device. Instead, the industrial devices can be installed at any location within wireless range of the mobile device's wireless interface (e.g., within NFC or Bluetooth range).

In addition to determining the type or model of industrial device 505, some embodiments of the industrial-enabled mobile device 202 may be further configured to determine whether the industrial device 502 is a safety device or a non-safety device before allowing the user to modify the industrial device's configuration settings. The mobile device 202 may then set the sequence of operations for changing the industrial device's configuration parameters based on this determination. For example, it may be desirable to enforce additional safety confirmation steps when writing new configuration settings to a safety device (e.g., a safety relay) versus writing new configuration data to a non-safety device (e.g., a vision system, a non-safety sensor, etc.). Accordingly, in response to determining that industrial device 502 is a safety device (e.g., using techniques described above in connection with FIG. 3), the industrial application component 212 may perform additional verification checks with industrial device 502 before sending the new configuration parameters to the industrial device. These steps may include, for example, requesting confirmation from the safety device that a controlled process or machine is in a safe state, requesting confirmation from the industrial device that the configuration changes requested by the user will not result in unsafe machine behavior, or other such verifications.

In some embodiments, industrial-enabled mobile device 202 can also facilitate documentation of an industrial device's configuration settings. For example, in addition to retrieving and displaying the industrial device's current configuration settings, the mobile device 202 may also save a copy of these configuration settings, either by storing the settings on the mobile device's local memory or by wirelessly transmitting the settings to remote storage (e.g., cloud-based storage maintained on cloud platform 106). In this way, plant personnel can easily retrieve and document the configuration settings for various devices making up an industrial system. Additionally, in some embodiments, after retrieving and storing configuration settings of a first industrial device, the industrial-enabled mobile device 202 can be used to write these stored configuration settings to a similar second industrial device. For example, if a plant engineer is commissioning a new VFD that requires an identical configuration setting as another VFD already in use on the plant floor, the plant engineer can use industrial-enabled mobile device 202 to read and store the configuration settings for the existing VFD as described above, wirelessly connect to the new VFD, and write the previously retrieved configuration settings to the new VFD.

The techniques described above can also be leveraged in some embodiments to perform pre-diagnosis on industrial devices. For example, some industrial devices may store and maintain local maintenance information, which can be read and translated by the industrial-enabled mobile device 202. The locally stored maintenance information may comprise, for example, device or component life cycle information that may determine when a device or one of its internal components should be replaced or maintained. In a non-limiting example, an electromechanical device may include a number of internal switches having a limited lifetime that is at least partially a function of the number of work cycles. Such devices may include a data register that tracks the number of work cycles performed by the device. In such examples, when a user brings the mobile device 202 near the electromechanical device, the mobile device 202 may wirelessly connect to the electromechanical device, read the work cycle data from the register, and determine whether the number of work cycles exceeds (or is approaching) a recommended maximum number of work cycles for that particular device. If the number of work cycles is determined to approach or exceed this maximum, the mobile device 202 can generate an alert indicating that the device (or the bank of switches installed within the device) should be replaced. In another example, an optical device (e.g., an industrial camera, a vision system, etc.) may be designed to detect dirt or other foreign bodies on its lens, which may lower the device's optical reserve or accuracy. The optical device may flag an internal register when such problems are detected. In a similar fashion to the previous example, the mobile device 202 can read this register and generate an alert indicating to the user that maintenance should be performed on the optical device. As in previous examples, the mobile device may perform these types of diagnoses based on a determined identity of the device being read, and by referencing local or remote information about the identified device (e.g., information identifying the device's diagnostic registers, information describing how the values within these registers should be interpreted, information describing appropriate alarm messages that should be generated based on the diagnostic register values, etc.).

The manner in which the industrial-enabled mobile device interacts with a given industrial device may be based not only on the device identity (e.g., the model of the device, the device vendor, etc.), but may also be a function of the device's status or the particular type of industrial application in which the industrial device is being used. For example, light curtains used in connection with stamping press machines must be located a safe distance from the dangerous moving components of the press. Accordingly, based on the knowledge that the light curtain is being used in a press application (e.g., based on manual entry of the type of industrial system being examined, based on information read from the device, etc.), the mobile device 202 may configure its graphical interface or alert messages to emphasize this safety aspect. This may include, for example, prompting the user to verify the safe distance, tracking the user's position using the mobile device's internal global positioning system and generating automated alerts in response determining that the user is approaching an unsafe distance from the device given the current operating state, etc. In another example, if the mobile device determines that the light curtain has been configured for muting functionality, the mobile device can configure the graphical interface or alert messages to assist the user in correctly positioning the muting sensors to be used for muting the light curtain (e.g., generating informational messages recommending installation locations for such muting sensors relative to the light curtain or other system components, etc.).

Figure 6:
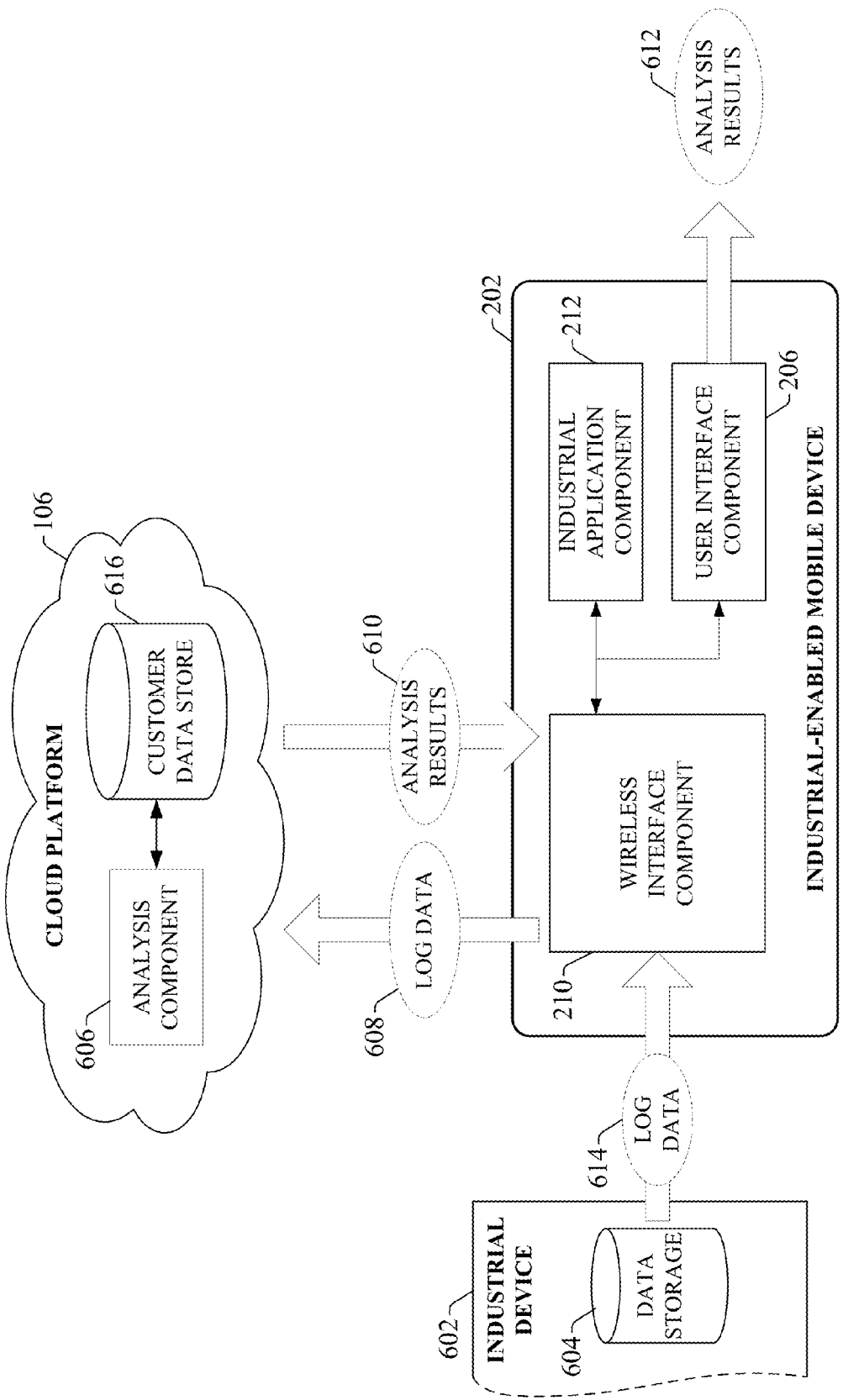
FIG. 6 illustrates retrieval of log data from an industrial device using an industrial-enabled mobile device.

In some scenarios, device data 506 may also comprise log data stored on industrial device 502. FIG. 6 illustrates retrieval of log data from an industrial device using an industrial-enabled mobile device. As in previously described examples, an industrial application component 212 leverages the mobile device's wireless interface component 210 to establish communication with industrial device 602. In this example, industrial device 602 is designed to collect and/or generate log data in connection with the industrial device's operation, and to store this log data on local data storage 604. The logged data can comprise, for example, time-stamped status or operational data generated by the industrial device 602 (e.g., measured temperature or speed trend data over time, an alarm or fault history for the industrial device, etc.) or historical data collected by the industrial device 602 from other connected sensors or telemetry devices.

After successfully connecting to industrial device 602, industrial application component 212 can cause the mobile device 202 to retrieve the log data 614 from the industrial device's local data storage 604. As in previous examples, industrial application component 212 may require biometric authentication from an owner of the mobile device 202 before permitting retrieval of the log data 614. Also similar to previous examples, mobile device 202 may initially poll industrial device 602 over the wireless connection to determine a type or identity (e.g., a model number) of the industrial device. Based on the determined type or identity of industrial device 602, industrial application component 212 can determine the available types of logged data available on the industrial device (e.g., by accessing a local or remote knowledgebase that identifies the data available for each of multiple different types of industrial devices). Alternatively, the mobile device 202 may discover the types of data available on industrial device 602 based on an examination of data storage 604 (e.g., during a handshaking sequence between industrial device 602 and mobile device 202).

Mobile device 202 can retrieve the log data 614 from industrial device 602 and store the retrieved data on the mobile device's local storage. The retrieved data can then be accessed and viewed via interaction with the mobile device's display screen. In some embodiments, industrial application component 212 can also perform analysis and/or diagnostics on the retrieved log data 614. Such analysis can be performed locally on mobile device using local analysis tools supported by industrial application component 212. Alternatively, in some embodiments, industrial-enabled mobile device 202 can send the log data 608 to cloud platform 106 for analysis by a remote web-based or cloud-based analysis service. In the example illustrated in FIG. 6, the cloud-based analysis service comprises a customer data store 616 for storing log data 608 received via the mobile device 202 (or pushed to the cloud platform 106 by other means) and an analysis component 606 that executes as a service on cloud platform 106. Analysis component 606 can perform analysis on the collected log data stored in customer data store 616, and return analysis results 610 to mobile device 202 for display on the mobile device's display screen.

Various embodiments of analysis component 606 can provide a range of analyses on industrial device data retrieved by mobile device 202. For example, the cloud-based analysis system can analyze logged trend data collected from the industrial device 602 to identify a system trend indicative of an impending system failure or operating inefficiency. Accordingly, the analysis service can return information identifying one or more recommended countermeasures for mitigating the impending system failure (e.g., replacement of the device, modification of one or more device parameters, etc.). In another example, the industrial-enabled mobile device 202 may retrieve a device profile from industrial device 602 that specifies the model number of the device, current firmware or software version installed on the industrial device, configuration settings for the industrial device, or other such information characterizing the identity, status, and/or configuration of the device. The mobile device 202 can send this device profile to the cloud-based analysis service, which can compare the device profile with up-to-date product information in a product resource data store to determine whether a newer version of the industrial device 602 or associated software/firmware for the device is available. Notification services on the cloud platform 106 can then deliver upgrade opportunity notifications to the mobile device 202 based on this determination. In yet another example, the cloud-based analysis service may analyze the log data 608 in view of other data sets collected for similar types of industrial systems (e.g., using machine learning, data mining, etc.) to identify dependencies or correlations that may otherwise be hidden to the customer. In this regard, data collected from one or more industrial devices at the user's plant facility can be correlated with data collected from similar industrial applications in use at other customer sites, and the analysis services can generate predictions and configuration recommendations based on learned correlations between asset configurations and system performance. Industrial application component 212 can render analysis results 612 generated either by local or remote analysis of the log data 614 on the display screen of mobile device 202 via user interface component 206.

In some embodiments, if local or remote analysis of the stored log data 614 yields a recommendation that one or more configuration parameters of the industrial device 602 be modified to improve performance, industrial application component 212 can offer the user the option to write the recommended configuration changes to industrial device 602 using mobile device 202. For example, based on local or remote analysis of log data 614, the industrial application component 212 may determine that increasing a particular setpoint value configured in the industrial device 602 by 10% may reduce occurrences of a recurring fault condition, or otherwise improve performance of the industrial device or related process. Accordingly, industrial application component 212 can render this information to the user via the display screen of the mobile device 202, and offer the user the option to write this new setpoint value to the industrial device 602, e.g., by pressing a graphical confirmation button rendered on the mobile device's display screen. Selecting the confirmation button will cause the mobile device to write the new setpoint value to industrial device 602, as described in previous examples.

Figure 7:
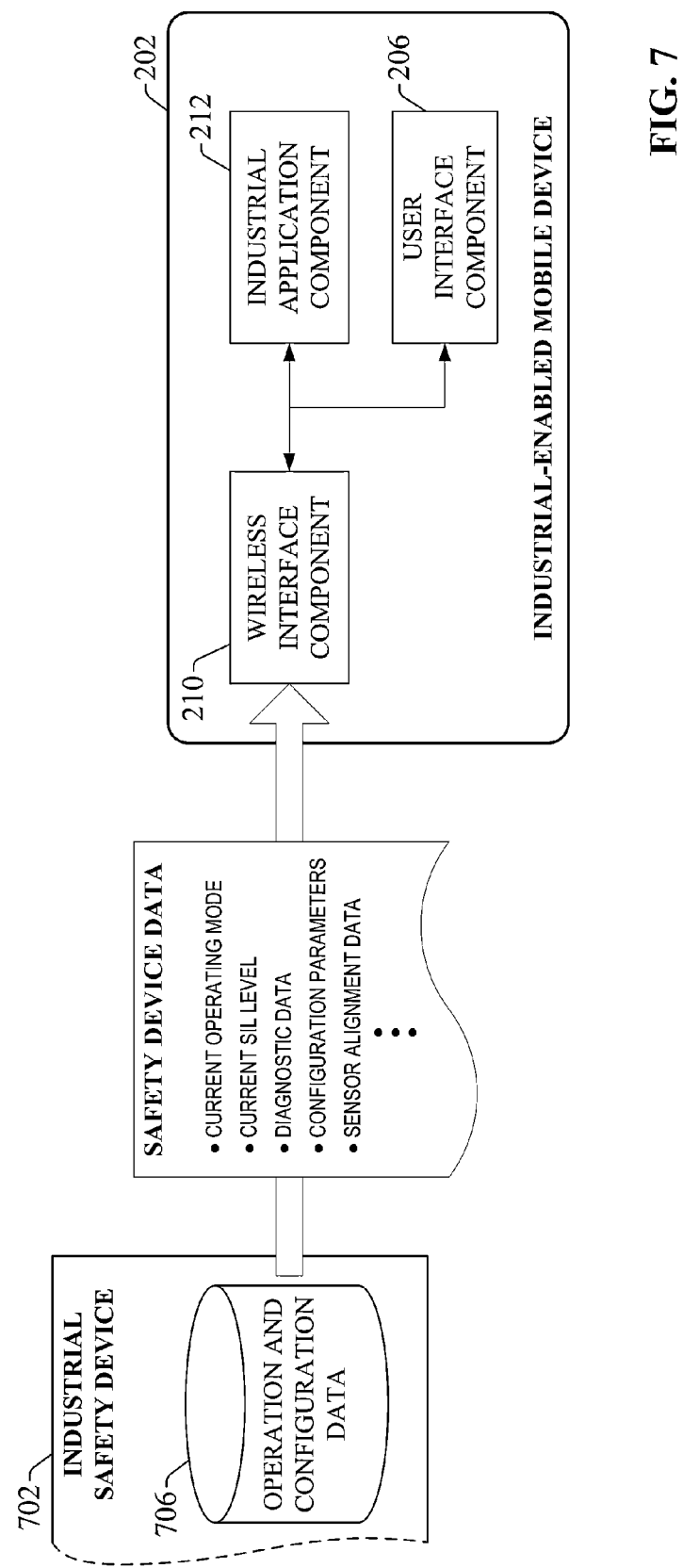
FIG. 7 illustrates interactions between an industrial-enabled mobile device and an industrial safety device.

The ability to read status and configuration data from industrial devices using a mobile personal electronic device may have particular utility when interfacing with industrial safety devices, such as safety relays, safety curtains, and the like. FIG. 7 illustrates interactions between an industrial-enabled mobile device 202 and an industrial safety device 702. Industrial safety device 702 may have a range of stored status, operational, and configuration data available for viewing and analysis. For example, an industrials safety device may maintain a data register indicating the light device's current safety integrity level (SIL), operating mode, or other relevant data. Versions of industrial application component 212 specific to safety applications can enable mobile device 202 to read and display this SIL level so that the owner of the mobile device 202 can confirm that the appropriate safety integrity level is being implemented. Mobile device 202 can also determine and indicate whether industrial safety device 702 is operating in standard mode or safety mode based on examination of the operation and configuration data stored in the safety device.

Moreover, some safety-related embodiments of industrial application component 212 can enforce safety-specific read/write permissions based on a role and/or identity of the user (e.g., the owner of mobile device 202), the current safety level and/or the safety functionality enabled on industrial safety device 702. For example, one or both of the industrial safety device 702 or mobile device 202 may store a file that defines which users are allowed to access industrial safety device, and what actions each user is permitted to perform relative to industrial safety device 702 as a function of the current safety integrity level of the relevant function of the industrial safety device. FIG. 8 illustrates an example file format 802 for storing such SIL-specific permissives for a safety function. As depicted in FIG. 8, each user identity 804 is granted particular sets of permissives 808 depending on the current SIL level 806. The permissives granted to each user may depend on the defined role of that user. For example, while maintenance personnel may be allowed to access and modify certain device parameters via mobile device 202 at high safety integrity levels, operators may only be allowed to access and modify these parameters at lower safety integrity levels.

Safety-specific embodiments of industrial application component 212 may be configured to enforce these SIL-specific permissives. For example, returning now to FIG. 7, a user may input a request to mobile device 202 to connect to industrial safety device 702 and modify a configuration parameter thereon. Industrial application component 212 may first request biometric confirmation of the user's identity, as described in previous examples. Industrial application component 212 can also wirelessly connect to industrial safety device 702 and determine the current SIL level of the safety device. Based on the determined user identity and the current SIL level, identity, industrial application component 212 can then reference the stored permissive file (e.g., a file having a format similar to that depicted in FIG. 8) to determine whether the user is permitted to perform the requested action given the current SIL level. Accordingly, the industrial application component 212 can then either carry out the requested action (e.g., perform the requested parameter modification) or deny the action based on this determination.

In scenarios in which the user permissive file is stored on industrial safety device 702 rather than on mobile device 202, the mobile device can send the biometrically confirmed user identity and a signal specifying the requested change to the safety device 702. The safety device 702 can then determine whether to carry out the requested action based on the stored permissive file. In some embodiments, the permissive file may be stored remotely (e.g., on cloud platform 106) rather than being stored locally on the mobile device 202 or industrial safety device 702. In such embodiments, mobile device 202 can send the user identity and the request to this remote location and await confirmation that the identified user is permitted to perform the action on safety device 702 prior to sending the request to the safety device.

In another example application, one or more embodiments of industrial-enabled mobile device 202 can be used to assist in sensor alignment. For example, proper alignment of certain through-beam photoelectric sensors or light curtains—e.g., sensors comprising an emitter and a receiver—can be determined based on the light intensity measured at the receiver. Some sensors and light curtains store a real-time analog value representing the light intensity measured at the received (e.g., the measured intensity of light emitted by the transmitter and seen by the receiver). Accordingly, proper alignment of the receiver and the transmitter can be determined based on a determination of whether this light intensity value exceeds a specified value.

One or more embodiments of industrial application component 212 can be configured to confirm proper alignment of such sensors or light curtains by reading this measured light intensity value from the sensor and confirming whether the measured value is within a range specified for the particular sensor indicative of proper alignment. For example, the owner of mobile device 202 can initiate an alignment verification routine supported by industrial application component 212. In response, industrial application component 212 can render a suitable graphical interface on the mobile device's display screen, and initiate wireless communication with the sensor or light curtain as described in previous examples (e.g., via Bluetooth, NFC, or other wireless communication protocol). In this example, industrial application component 212 has access to information specifying the minimum light intensities signifying proper alignment for multiple different types of sensors or light curtains. This information can be stored locally on mobile device 202 (e.g., stored on the mobile device's local memory when industrial application component 212 is installed, and updated as needed via the wireless interface component 210 when such updates become available). Alternatively, this information may be stored remotely—e.g., on cloud platform 106—and industrial application component 212 can access this information via wireless interface component 210.

Since determination regarding whether the sensor's measured light intensity indicates proper alignment depends on the model or type of sensor being examined, industrial application component must first identify the sensor model or type. In some embodiments, industrial application component 212 can prompt the user to enter the sensor model or type manually via the mobile device's display screen, or to select the sensor or light curtain model from a displayed list of supported devices. Alternatively, industrial-enabled mobile device 202 can determine the sensor information automatically, either by reading sensor identification information stored on the sensor, or using techniques described above in connection with FIG. 2.

After the sensor or type has been identified, the industrial application component 212 can instruct mobile device 202 to read the measured light intensity value from the appropriate register of the sensor's memory over the established wireless connection. In some embodiments, industrial application component 212 can use the previously determined sensor type information to determine which area of the sensor's memory the light intensity value is located. Once the light intensity value has been retrieved, industrial application component 212 can compare the measured value with the expected minimum light intensity value signifying proper alignment for the identified sensor type or model. If the measured intensity indicates proper sensor alignment, industrial application component 212 can render a confirmation message on the graphical interface of the mobile device's display screen. Alternatively, if the measured intensity indicates that the sensor or light curtain is not properly aligned, industrial application component 212 can render a suitable message indicating that the sensor is out of alignment. In some embodiments, industrial application component 212 may also generate and display recommendations for correcting the misalignment based on the light intensity value and, if appropriate, other information read from the sensor. For example, industrial application component 212 may indicate an estimated degree of misalignment based on a comparison of the measured light intensity with the known optimal light intensity for the indicated sensor type.

Figure 9A:
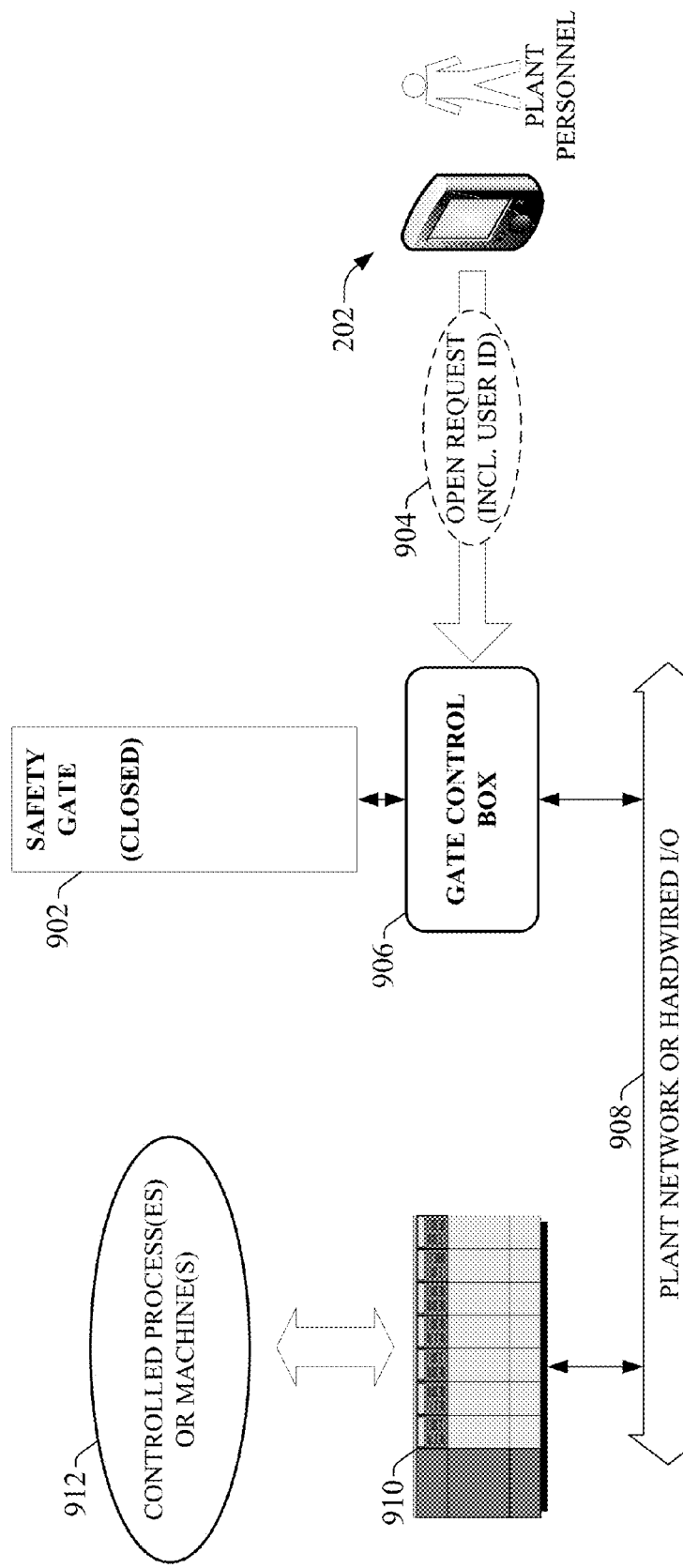
FIG. 9A illustrates an example gate control system that facilitates access to a safety-secured area in response to commands initiated via an industrial-enabled mobile device.
Figure 9B:
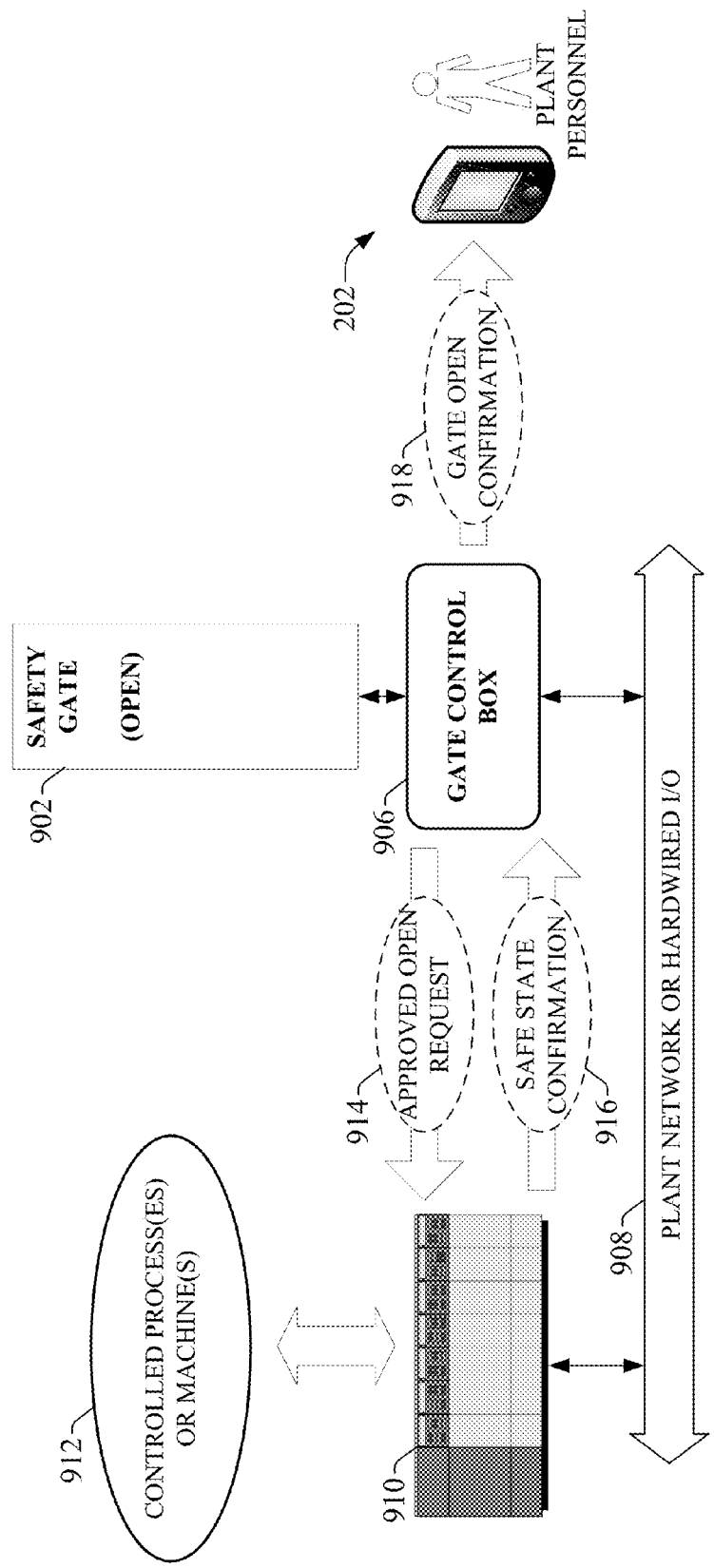
FIG. 9B illustrates the example gate control system in response to receipt of an authenticated gate open request.

Some embodiments of industrial-enabled mobile device can act as a mobile human-machine interface (HMI) that facilitates regulated access to gated areas of an industrial facility without requiring the user to touch the gate control system. FIGS. 9A and 9B illustrate an example gate control system that facilitates access to a safety-secured area in response to commands initiated via an industrial-enabled mobile device. In this example scenario, an area within an industrial facility—e.g., a hazardous area near a controlled industrial machine or process 912—is enclosed within a protective barrier (e.g., a safety cage) and is accessible only through a controlled safety gate 902. The machine or process 912 is controlled by an industrial controller 910 (e.g., PLC or other automation controller). Controller 910 also communicates with gate control box 906, which controls opening and closing of safety gate 902. Industrial controller 910 may communicate with gate control box 906 over a plant network or hardwired I/O 908, such that gate control box 906 can be made aware of the state of the controlled machine or process 912 based on information received from the industrial controller 910.

In this example, a user can initiate a request to open the gate via industrial-enabled mobile device 202 using an embodiment of the industrial application component 212 specific to gate control. In response to a command from the user to launch the gate control application, the industrial application component 212 can render a graphical interface for gate control on the display screen of mobile device 202. Mobile device 202 may also detect the presence of gate control box 906 within range of the mobile device's near field communication interface, and initiate wireless communication with the gate control box 906. The user can then initiate a request to open the safety gate 902 via suitable interaction with the graphical interface.

Before sending the request to the gate control box, the graphical interface may prompt the user to enter biometric information in order to confirm the user's identity, as described in previous examples. Mobile device 202 can then send the open request 904 to the gate control box together with the biometrically authenticated user identity.

Since access to the protected area may be restricted only to authorized personnel, gate control box 906 may store a file identifying all personnel or user roles granted permission to enter the protected area. Upon receiving the open request 904 from the industrial-enabled mobile device 202, the gate control box 906 can compare the user identity bundled with the open request 904 with the stored identities of authorized personnel. If the gate control box 906 determines that the user identity (or the role associated with the user identity) is not an authorized user, the gate control box 906 can return a denial message to mobile device 202 indicating that the user has not been granted access to the protected area.

Alternatively, as illustrated in FIG. 9B, if the user identity is determined to correspond to an authorized user, gate control box can send an approved open request 914 to the industrial controller 910. In response, the industrial controller 910 can instruct the controlled machine or process 912 to transition to a safe state in order to prepare for human access. For example, if the controlled machine or process 912 is currently running, the industrial controller 910 may allow the process or machine to complete its current work cycle, then return the process or machine to a safe state (e.g., place the machine in a Home position and switch to a non-automatic mode, de-energize potentially dangerous equipment, etc.). Once the industrial controller 910 confirms that the controlled machine or process 912 is in a safe state, the industrial controller 910 can send a safe state confirmation 916 to the gate control box 906 indicating that the protected area is safe to enter. In response to this confirmation, gate control box 906 can open the safety gate 902 and send a gate open confirmation to the mobile device 202 over the wireless communication channel. The industrial application component may render a confirmation message on the graphical interface of the mobile device's display screen indicating that the protected area is safe to enter.

Since the industrial-enabled mobile device 202 biometrically confirms the user's identity when a request to open the safety gate is initiated, gate access requests by plant personnel can be tracked and logged, e.g., using a higher level system on the plant facility or by a cloud-based tracking system that executes on cloud platform 106. For example, each time a user initiates a request to open the safety gate 902, industrial-enabled mobile device 202 can send a record of the request to the higher level system in parallel with the gate opening sequence, thereby creating an access log for the protected area that identifies a time of access (or a time of a denied access request) and an identity of the user who initiated the access request.

Figure 10:
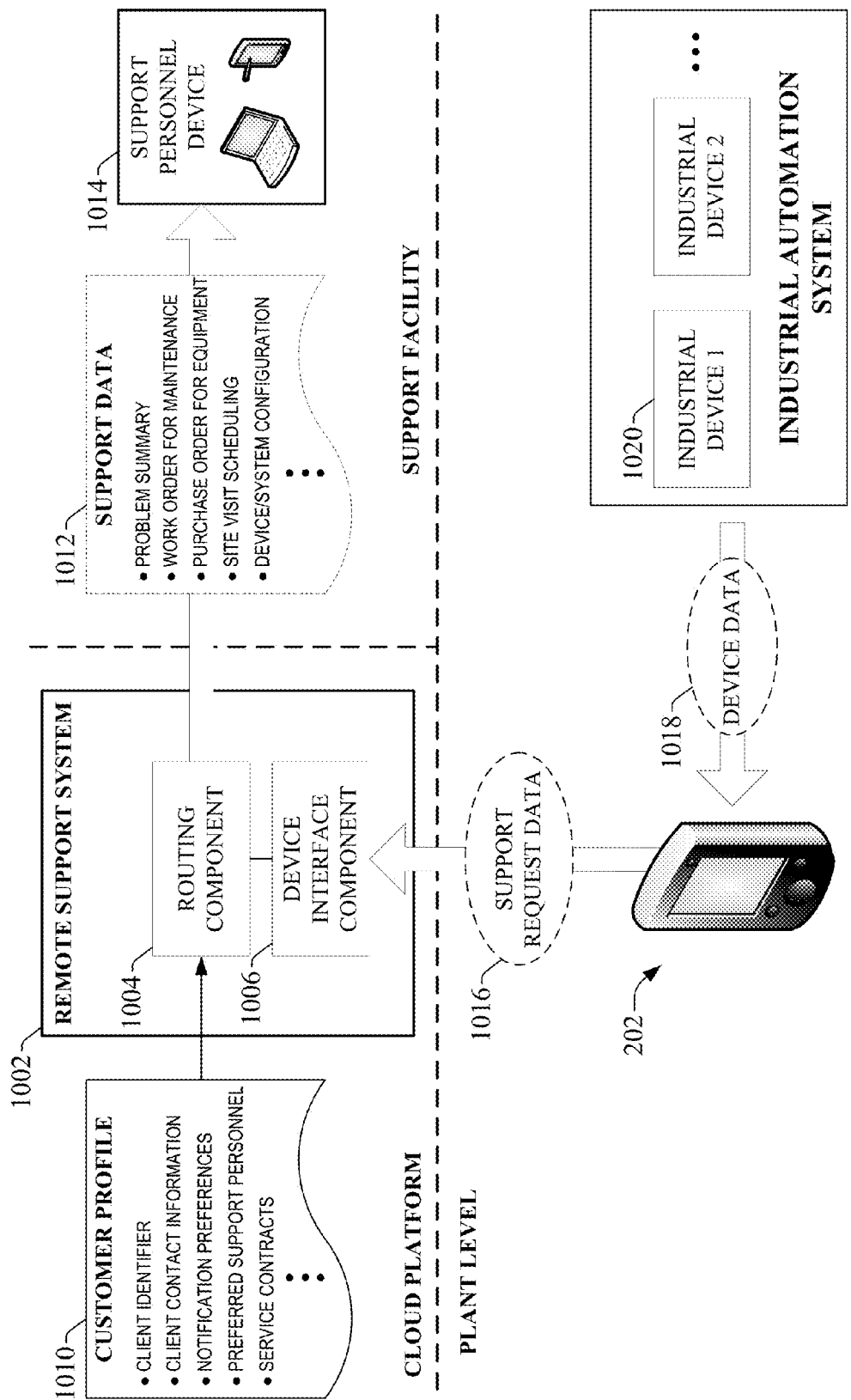
FIG. 10 illustrates an industrial-enabled mobile device that can be used to link a user to remote technical support, and to route relevant industrial device data to remote technical support personnel.

FIG. 10 illustrates another example embodiment of industrial-enabled mobile device that can be used to link a user to remote technical support, and to route relevant industrial device data to remote technical support personnel. As described in previous examples, industrial-enabled mobile device 202 is configured to wirelessly communicate with one or more industrial devices 1020 of an industrial automation system using the mobile device's wireless interface (e.g., NFC, Bluetooth, etc.), and to retrieve device data 1018 from the industrial devices. Device data 1018 may comprise, for example, device identifiers; configuration parameter settings; log data comprising historical status, operational, or measured data for the industrial device; current firmware or software versions installed on the industrial device; or other such information.

According to this embodiment, industrial-enabled mobile device 202 can be used to initiate contact with a remote technical support entity for assistance with a technical support issue relating to industrial devices 1020, and to route relevant system information to the remote technical support entity to facilitate identifying and resolving the issue. To this end, the industrial application component executing on mobile device 202 can generate and render a suitable graphical interface on the mobile device's display screen, which includes a selectable option for initiating remote support (e.g., a graphical button or other input means). In some embodiments, the request for remote assistance can be initiated after device data 1018 has been collected from industrial devices 1020. Alternatively, industrial-enabled mobile device 202 may be configured to respond to the technical support request by discovering one or more industrial devices within the mobile device's wireless range, initiating communication with the industrial devices, and retrieving device data 1018 from the devices that may be relevant to identifying and resolving potential performance or maintenance issues with the devices. In yet another example, the industrial application component 212 may implement a troubleshooting wizard on the mobile device 202 to facilitate location and retrieval of relevant data from one or more of the industrial devices 1020.

Once the device data 1018 has been gathered from the industrial devices 1020, and in response to initiation of the remote support request, mobile device 202 can send support request data 1016 to a cloud-based remote support system 1002. Support request data 1016 may include a customer identifier associated with the plant facility (appended to the request by the industrial application component executing on mobile device 202), a request for remote support, and at least a subset of the device data 1018 collected by mobile device 202.

The support request data 1016 is received by a device interface component 1006 of the cloud-based remote support system 1002, and provided to a routing component 1004, which may perform additional processing on the support request data 1016 prior to sending a request to a remote support representative. In some embodiments, routing component 1004 can perform this additional processing based on previously captured knowledge of the customer's system maintained in a cloud-based customer data store (not shown), or in a customer profile 1010 stored on the cloud platform and containing customer-specific information about the owner of industrial devices 1020. For example, upon receipt of support request data 1016, the routing component 1004 may extract the customer identifier from the request and retrieve additional information about the customer from the customer data store or customer profile 1010.

Customer profile 1010 can contain customer-specific information and preferences, which can be leveraged by remote support system 1002 to determine how support requests should be handled. Example information maintained in customer profile 1010 can include a client identifier, client contact information specifying other plant personnel who be contacted in response to a technical support request (where the identified plant personnel may be dependent upon a production area or hierarchical level for which technical support is required), notification preferences specifying how plant personnel should be notified (e.g., email, mobile phone, text message, etc.), preferred technical support personnel to be contacted in the event of a detected device performance issue, service contracts that are active between the customer and the technical support entity, and other such information. Remote support system 1002 can marry data collected for respective customers with the customer model for identification and event handling purposes. In some embodiments, the cloud-based remote support system 1002 can serve a custom interface to client devices of authorized plant personnel to facilitate entering or editing the customer profile 1010. In other embodiments, all or portions of the customer profile 1010 can be updated in near real-time based on data maintained on a local server on the plant facility. For example, if an engineering manager is replaced, an administrator at the plant facility may update a locally maintained employee database with the name and contact information for the new manager. The employee database may be communicatively linked to the cloud platform, such that the contact information stored in the customer profile 1010 is automatically updated to replace the contact information of the outgoing manager with the new employee contact information.

In some embodiments, routing component 1004 can glean additional customer-specific context that may assist in diagnosing the performance problem by referencing system, process, asset, and/or device data stored in the cloud-based customer data store. Such context may include additional information about the devices and/or machines with which the industrial devices 1020 interact (e.g., identities of such devices, as well as their role in the overall industrial system and their functional relationship to industrial devices 1020 in particular), other upstream or downstream processes whose operation may have an impact on operation of the industrial devices 1020, etc.

Some embodiments of routing component 1004 can also compare all or portions of support request data 1016 relating to performance of industrial devices 1020 at the time of the support request with corresponding sets of historical performance data for industrial devices 1020 stored in the cloud-based customer data store. Based on these comparisons, routing component 1004 can identify performance metrics that deviated from normal or preferred operation before, during, and after the detected event so that such deviations can be identified to the remote support representative. Such comparisons can be relative to previously established baseline metrics. In addition, since support request data 1016 may include collected performance data from other devices or machines that have a functional relationship with industrial devices 1020, routing component 1004 can also compare performance metrics for these other devices at the time of the support request with previously collected performance data for these devices. Such analysis can provide insight into possible root causes of detected performances issue that are external to the industrial devices 1020 themselves. For example, based on such analysis, routing component 1004 may determine that an abnormality of an upstream machine or process is a possible root cause of the performance issue detected at one of the industrial devices 1020.

Also, in one or more embodiments, routing component 1004 can analyze support request data 1016 in view of product data maintained in a product knowledgebase to yield additional information that may be relevant to diagnosis of the performance issue. For example, routing component 1004 may use device identifiers for the industrial devices 1020 contained in support request data 1016 to retrieve vendor-provided information about those industrial devices from the product knowledgebase to determine whether the firmware versions currently installed on the devices 1020 are up-to-date. The product knowledgebase may include vendor-provided product information regarding current firmware versions, software versions, hardware versions, etc. Accordingly, routing component 1004 can retrieve recent product information for the devices identified by the support request data 1016, compare a firmware version number indicated by support request data 1016 with the most recent firmware version number indicated by the product knowledgebase, and make a determination regarding whether the on-premises industrial devices 1020 are using the most recent firmware version.

Routing component 1004 may also reference the product knowledge base to determine whether there are known performance problems (e.g., reported technical issues, recently discovered product bugs, etc.) associated with any of the devices identified by the support request data 1016. These performance issues may be a function of the particular software or firmware being run on the devices (reported to the remote support system 1002 in support request data 1016), and accordingly, the routing component 1004 may determine that installing a different software or firmware version on the device will correct the performance problem.

In another example, a device vendor may report a known compatibility issue with their industrial device, a discovered performance issue with their device when a particular firmware version is installed, or other known problems with their device. Accordingly, routing component 1004 can access the product knowledgebase to determine whether there are known vendor-reported issues with one or more of the industrial devices 1020 or related devices identified by support request data 1016. This information can also be reported to the remote support representative to facilitate rapid and accurate diagnosis.

Once preliminary processing of support request data 1016 has been completed, routing component 1004 can package the processed data—including support request data 1016 and any additional data generated through the analyses described above—as aggregated support data 1012. Routing component 1004 can then determine a suitable technical support representative to assist the customer in diagnosing the reported issue. In some embodiments, based on examination of aggregated support data 1012, routing component 1004 can determine an area of expertise or competency required to diagnose the issue, based on such factors as the particular industrial devices or device types that are involved, the industry in which the industrial device is being used (e.g., automotive, pharmaceutical, oil and gas, food and drug, plastics, textiles, etc., as identified by customer profile 1010), or other such considerations.

Routing component 1004 can then reference a set of stored competency profiles to determine a suitable remote support representative or department to assist the customer in addressing the support issue. Competency profiles can be associated with respective technical support individuals or departments, and store information specifying areas of expertise for the respective individuals/departments. An example competency profile for a given technical support representative can include a list of devices or device types that the representative is competent to diagnose, the representative's industries of expertise, types of industrial applications in which the representative has experience, or other relevant data that can be used by the system to match a suitable representative to the reported issue. In an example scenario, if the reported issue relates to a motor drive failure, routing component 1004 can determine the type of motor drive based on examination of aggregated support data 1012 and match the issue to a competency profile associated with a motor drives department of a remote technical support facility. In some embodiments, selection of an appropriate support representative can also be based on customer preferences maintained in customer profile 1010, which may specify one or more support representatives preferred by the customer.

Routing component 1004 can then route the aggregated support data 1012 to the technical support representative or department whose profile matches the reported issue. This can involve sending a notification, together with all or portions of aggregated support data 1012, to one or more client devices 1014 associated with the selected support representative or department. The rich set of data contained in aggregated support data 1012 can quickly convey the nature of the problem to the technical support representative via the client device 1014 without requiring the customer to have extensive knowledge of their own system. Moreover, the additional customer-specific information maintained in the cloud-based customer data store can be accessed by the customer support representative via the cloud platform so that additional knowledge of the customer's system can be obtained if necessary.

Aggregated support data 1012 can comprise a variety of information to assist the remote support representative with diagnosis. For example, aggregated support data 1012 can include a summary of the detected problem and an identification of the affected industrial device(s). Since a reported device failure or performance degradation can be a function of the behavior of other related devices or assets, aggregated support data 1012 can also include system configuration information describing the system of which the affected device is a component. This can include identification of related devices or machines, the relationship of these other devices or machines to the affected device, information that is shared between the devices, how the various devices are networked (including identities and locations of network architecture devices used to network the system), and other such system configuration information. Relevant contextual information (e.g., a location of the affected device within a the overall enterprise or plant hierarchy, timestamp data, quality indicators, machine or process states, identification and locations of plant personnel at the time of the detected event, etc.) can also be provided via aggregated support data 1012.

Aggregated support data 1012 can also identify system deviations from baseline performance metrics and configurations. In this regard, routing component 1004 can compare the performance and device configuration data provided by mobile device 202 with corresponding baseline performance metrics and device configuration data maintained in the cloud-based customer data store in order to identify aspects of the customer's system (e.g., performance indicators, configuration parameters, software versions, etc.) that have deviated from their baseline values. These deviant aspects can be identified to the customer support representative as being potentially relevant to diagnosis of the reported issue.

In some embodiments, aggregated support data 1012 can provide the remote service representative with a virtual representation of the customer's system based on the customer data maintained on the cloud platform. This virtual representation can leverage any suitable customer data (e.g., device, process, asset, and/or system data) to construct a virtual representation of the customer's production area, plant, or other subset of the industrial enterprise. In an example scenario, the virtual representation can comprise a three-dimensional representation that can be navigated by the customer service representative, where the representation includes graphical representations of the customer's devices and assets. These graphical device representations can be located and oriented with respect to one another to simulate their respective locations in the plant, thereby allowing the customer support representative to explore the customer's system in a manner that simulates their presence on the plant floor. The remote support system can overlay graphical indicators on particular areas of the customer's industrial system (e.g., devices, production areas, etc.) that may be experiencing a performance issue, or that may be a cause of an issue detected at another part of the plant. These indicators can be based, for example, on the baseline deviations described above.

Depending on the active service contract between the customer and the technical support entity, aggregated support data 1012 may include automatically generated work order information for maintenance or purchase order information for equipment depending on the nature of the detected issue. For example, if the remote support system diagnoses the detected performance issue as one that requires an on-site support visit or a replacement device, routing component 1004 can automatically generate the necessary work order or purchase order for delivery to the technical support entity. In the event that an on-site visit is deemed necessary, the system may also automatically schedule the on-site visit. In this regard, the remote support system can, for example, access an on-site scheduling system maintained by the customer support entity (either locally at the support facility or on the cloud platform) to determine available times and technicians.

In addition to providing relevant device and customer data, the remote support system 1002 may also provide the remote support representative with contact information for the owner of mobile device 202 (e.g., a phone number of the mobile device 202 if the mobile device is a phone, an email address, etc.), allowing the representative to contact the employee directly, e.g., via mobile device 202 or other personal client device belonging to the plant employee. In addition or alternatively, the remote support system 1002 can automatically establish a communication channel between the support representative's personal device (e.g., desktop computer, laptop, tablet, mobile device, wearable computer, etc.) and the mobile device 202. This may involve initiating a phone call to the mobile device, or establishing a video conference between the employee and the support representative via the cloud platform.

Some embodiments of the cloud-based remote support system 1002 can also include tools that allow the plant employee to send supplemental information about a reported issue to the technical support representative. Since the remote support system 1002 creates a unique issue identifier for each reported issue, the owner of industrial-enabled mobile device 202 can use the mobile device to generate supplemental information about the problem and upload this additional information to the cloud platform in association with the issue identifier. For example, the customer may decide that the photographs or video of an affected machine or device may assist the support representative in diagnosing the cause of a reported performance issue. In this scenario, the customer can take a photograph or video footage of the relevant machine or device using mobile device 202. Then, through interaction with a graphical interface generated by the industrial application component executing on mobile device 202, the user can establish a login session with the cloud-based support system, enter or select the open issue identifier, and upload the photograph or video to the remote support system in association with the open issue identifier. In response to receiving the photograph or video, the routing component 1004 can deliver the photograph or video, tagged with the issue identifier, to the personal client device associate with the relevant support technician. The remote support system may also store the received photograph or video in a record for the open support issue together with previously provided information.

Figure 11:
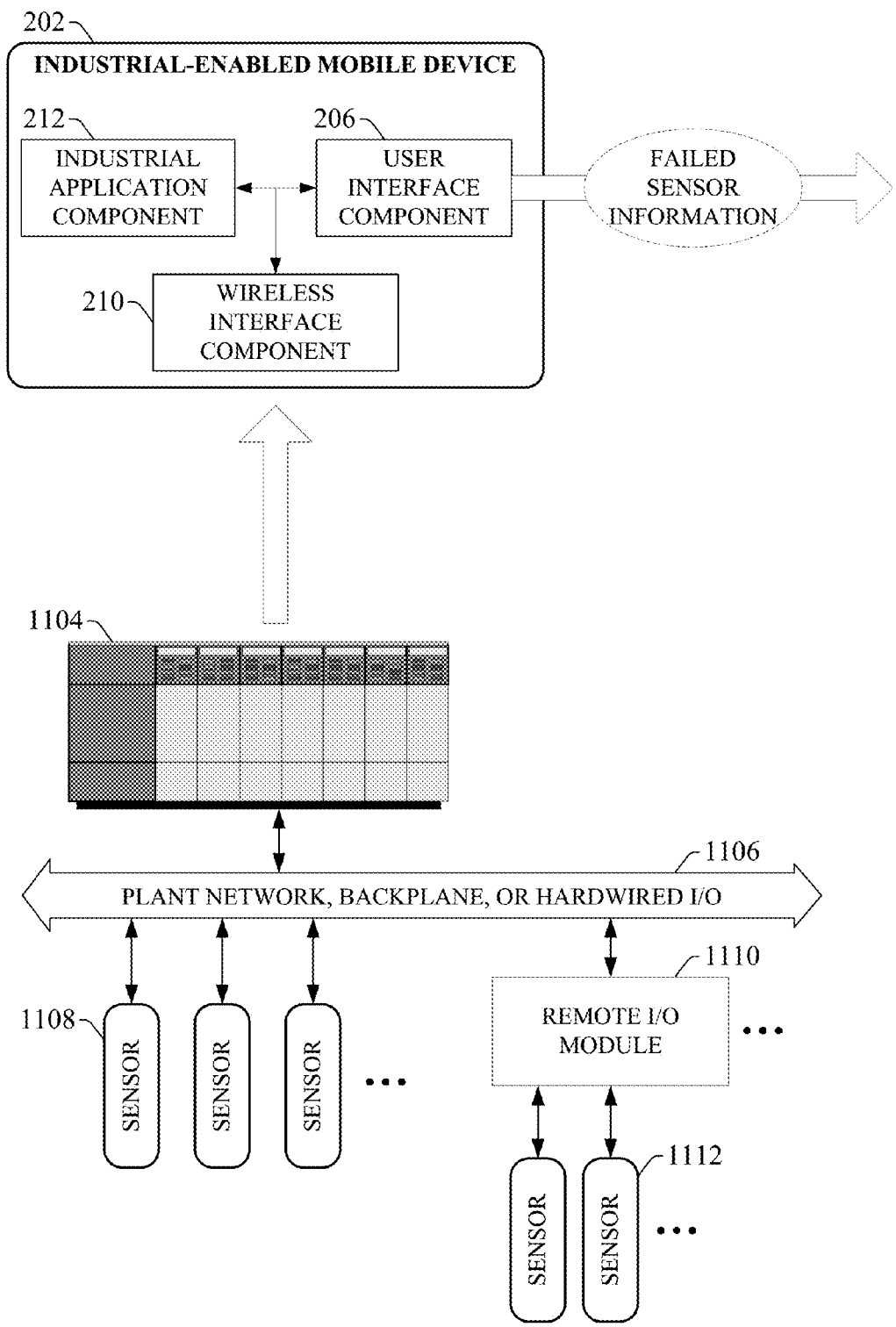
FIG. 11 illustrates an industrial-enabled mobile device that can be used to locate failed sensors or other industrial input devices.

FIG. 11 illustrates another embodiment of industrial-enabled mobile device 202 that can be used to locate failed sensors or other industrial input devices. In this example, an industrial control system comprises an industrial controller 1104 (e.g., a PLC or other type of industrial controller) and multiple sensors that provide measured input data to the controller (as well as a number of output devices controlled by the industrial controller 1104, which are not shown in FIG. 11). The sensors can comprise digital sensors (e.g., proximity sensors, photoelectric sensors, etc.) or analog sensors (e.g., distance sensors, analog telemetry devices or meters, etc.). Some sensors (e.g., sensors 1108) may communicate with industrial controller 1104 over one or more of a plant network, the controller backplane, or a hardwired I/O connection to the industrial controller's input modules. Other sensors (e.g., sensors 1112) may send their data to industrial controller 1104 via a remote I/O module, which communicates with the industrial controller over a network connection or the controller's backplane.

In one or more embodiments, industrial-enabled mobile device 202—executing industrial application component 212—can be used to identify and locate a failed sensor, either by direct wireless communication with the failed sensor or by inferring the identity of the failed sensor through coordination with other devices.

In a first example, a sensor may be designed to emit a wireless beacon (e.g., an infrared or radio frequency beacon) when the sensor is in a failed state. Accordingly, embodiments of industrial application component 212 designed to detect sensor failures can leverage the mobile device's wireless interface to detect this beacon and generate a notification on the mobile device's display screen via user interface component 206 in response to detecting this beacon. Industrial application component 212 can also determine a location of the source of beacon relative to the mobile device, and render directional information on the mobile device's display screen to guide the user to the location of the failed sensor. Thus, a plant employee can use their personal mobile device to detect and locate a failed sensor in order to effect repair or replacement.

In another example, rather than detecting the failed sensor through direct wireless communication with the sensor, industrial-enabled mobile device 202 can be configured to identify and locate the failed sensor through interaction with other devices comprising the industrial control system. For example, in response to a command from the owner of mobile device 202, industrial application component 212 can cause the mobile device 202 to establish wireless communication with industrial controller 1104, as described in previous examples. Based on information regarding the particular type or model of the industrial controller (either manually provided by the user or determined during a handshaking sequence between the mobile device 202 and industrial controller 1104), the industrial application component 212 can determine the data registers within the industrial controller's data table that correspond to the various input devices that interface with the industrial controller 1104. The industrial controller's data table may include information regarding the types of input devices corresponding to the respective digital and/or analog input points of the controller's input modules, user-defined names or descriptions for each input (e.g., "Part present at Station 1," "Mixer 1 Fill Level," "Part Placement Station Light Curtain," etc.), I/O address information for each input, and/or diagnostic information for each input device. Industrial application component 212 can read and interpret this data table information from industrial controller 1104, and render status information for the respective input devices based on this retrieved data. Industrial application component 212 can identify failed sensors based on the retrieved information, and flag these sensors on the mobile device's display screen. Since the names or descriptions associated with each sensor are read from the industrial controller 1104 and rendered on the display, sensors flagged as being failed can be quickly identified.

In addition to communication with an industrial controller, industrial-enabled mobile device 202 can determine or infer the identity and/or location of a failed sensor based on communication with other types of devices, including but not limited to remote I/O module 1110, a safety relay wired to one or more sensors, etc. In another example, mobile device may determine that a transmitting photoelectric sensor has failed by wirelessly reading a failure indication from the mating receiver photoelectric sensor.

FIGS. 12-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 12:
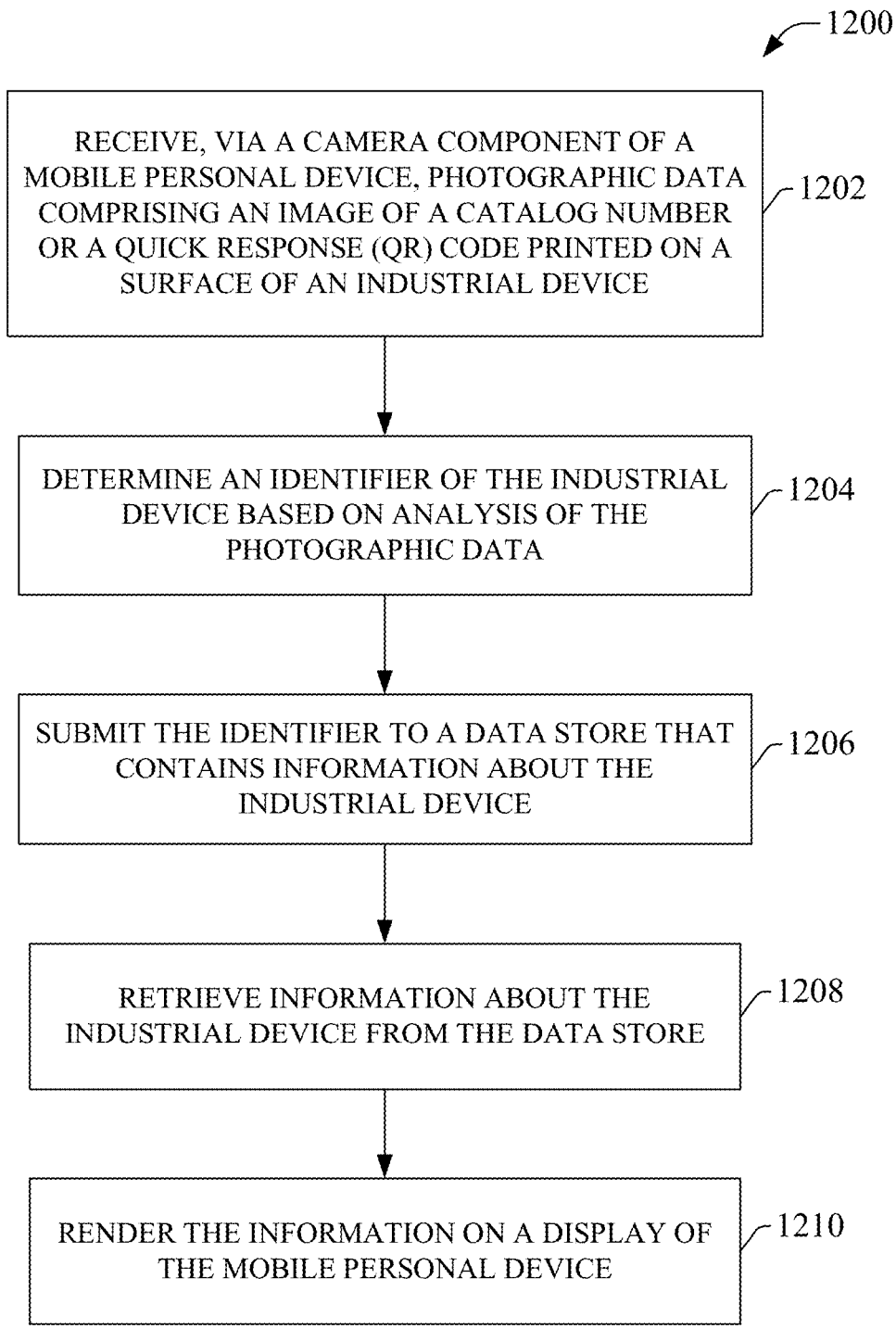
FIG. 12 is a flowchart of an example methodology for identifying an industrial device using a mobile personal electronic device.

FIG. 12 illustrates an example methodology 1200 for identifying an industrial device using a mobile personal electronic device, such as a mobile phone or tablet computer. Initially, at 1202, photographic data comprising an image of a catalog number or a quick response (QR) code of an industrial device is received via an integrated camera component of a mobile personal device. The photographic data can be generated by taking a photograph of the catalog number or QR code printed on a surface of the industrial device using the personal mobile device. The industrial device can comprise, for example, an industrial controller, a sensor, a telemetry device, a motor drive, a safety relay, or other such device.

At 1204, an identifier of the industrial device is determined based on analysis of the photographic data. This can comprise, for example, translating the QR code, or performing optical character recognition on the catalog number contained in the photographic data. At 1206, the identifier determined at step 1204 is submitted to a data store that contains information about the industrial device. The data store may comprise, for example, a product database or knowledgebase containing information about various industrial devices, categorized by catalog number. In some embodiments, the data store may reside locally on the mobile personal device. Alternatively, the data store may reside remotely relative to the mobile personal device, e.g., on a cloud platform accessible by the mobile personal device via an Internet connection. In such embodiments, the mobile personal device can submit the translated device identifier to the remote data store via the mobile device's wireless interface.

At 1208, information about the industrial device is retrieved from the data store. This information may include, for example, a name and function of the industrial device, technical documentation for the industrial device, recommended configuration settings for the industrial device, contact information for technical support entities who may be able to provide expert assistance with installation or maintenance of the industrial device, or other such information. At 1210, the information retrieved at step 1208 is rendered on a display of the mobile personal device.

Figure 13:
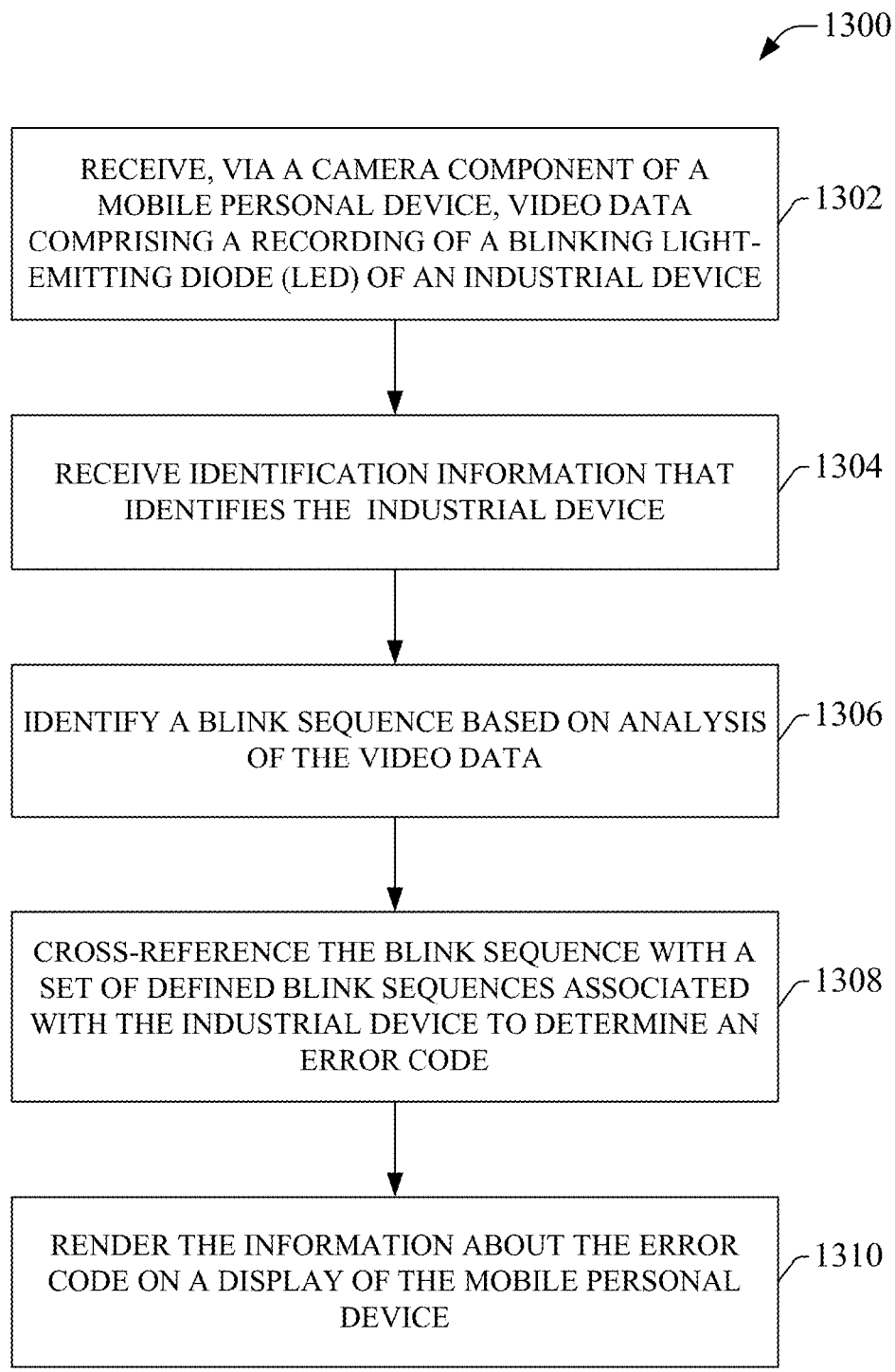
FIG. 13 is a flowchart of an example methodology for interpreting an LED blinking sequence on an industrial device.

FIG. 13 illustrates an example methodology 1300 for interpreting an LED blinking sequence on an industrial device. Initially, at 1302, video data comprising a recording of a blinking LED on an industrial device is received via a camera component of a mobile personal device. The video data can be obtained, for example, by recording a video of the industrial device using the mobile device's integrated video recorder. At 1304, identification information that identifies the industrial device is received. This identification can comprise, for example, vendor information and/or a model or catalog number of the industrial device. The identification information can be provided manually via the mobile device's touch screen, or can be determined automatically by interpreting a catalog number or QR code contained in the video recording of the industrial device, using a methodology similar to that described above in connection with FIG. 12.

At 1306, a recorded blink sequence is identified based on analysis of the video data. For example, the mobile device may be configured to identify a portion of the video data corresponding to a flashing LED, and to perform an analysis on this portion of the video to identify the blink sequence being rendered by the LED. At 1308, the identified blink sequence is cross-referenced with a set of blink sequences associated with the identified industrial device to determine the error code represented by the blink sequence. This can be accomplished, for example, by submitting a distinctive blink sequence identifier corresponding to the translated blink sequence to a product knowledgebase containing information about known error codes for various industrial devices and the respective blink sequences used to indicate each error code. At 1310, information about the error code is rendered on the display screen of the mobile personal device. The information may comprise a description of the error and recommended actions for clearing the error or for mitigating possible future occurrences of the error.

Figure 14:
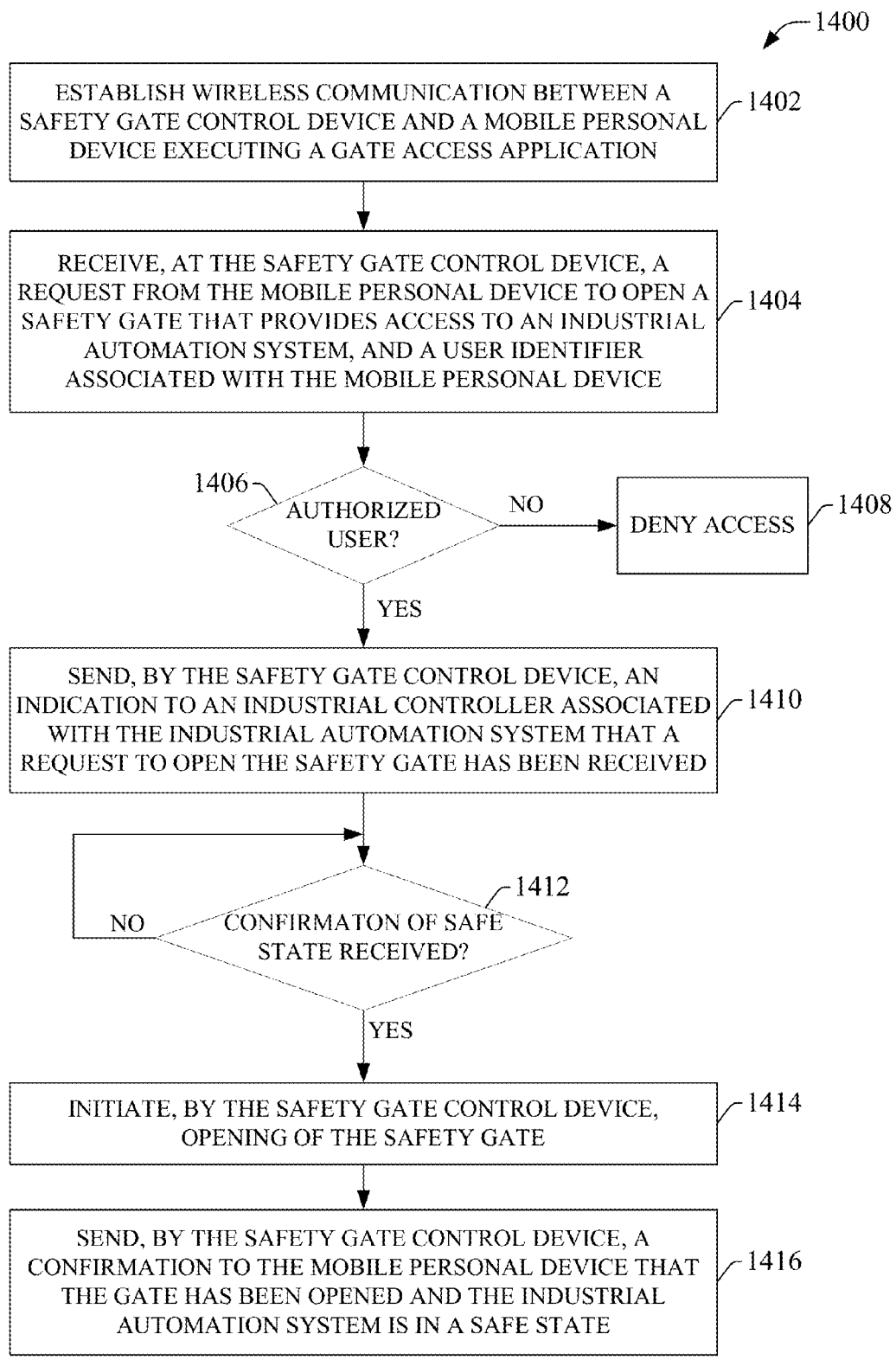
FIG. 14 is a flowchart of an example methodology for initiating safety gate access using a mobile personal device.

FIG. 14 illustrates an example methodology 1400 for initiating safety gate access using a mobile personal device. Initially, at 1402, wireless communication is established between a safety gate control device and a mobile personal device executing a gate access application. The wireless communication can be established, for example, using the mobile device's Bluetooth or NFC capabilities. At 1404, a request from the mobile personal device to open a safety gate is received at the safety gate control box, together with a user identifier associated with the mobile personal device. In some scenarios, the safety gate may provide access to a protected area near an industrial automation system, and the owner of the mobile device wishing to access the protected area initiates the open request from the mobile device. At 1406, a determination is made regarding whether the user is authorized to enter the protected area. This determination may be made by the safety gate control device based on the received user identifier and stored permissive information identifying which users are permitted to access the protected area. If it is determined at 1406 that the user is not an authorized user, access is denied at 1408. Alternatively, if it is determined at 1406 that the user is authorized, the methodology moves to 1410, where the safety gate control device sends an indication to an industrial controller associated with the industrial automation system that a request to open the safety gate has been received.

At 1412, a determination is made regarding whether a confirmation that the industrial automation system is in a safe state has been received from the industrial controller. If no such confirmation has been received, the methodology continues to wait until the safe state confirmation has been received from the industrial controller. When the confirmation has been received, the methodology moves to step 1414, where the safety gate control device initiates opening of the safety gate. At 1416, the safety gate control device sends a confirmation to the mobile personal device that the gate has been opened and the industrial automation system is in a safe state.

Figure 15:
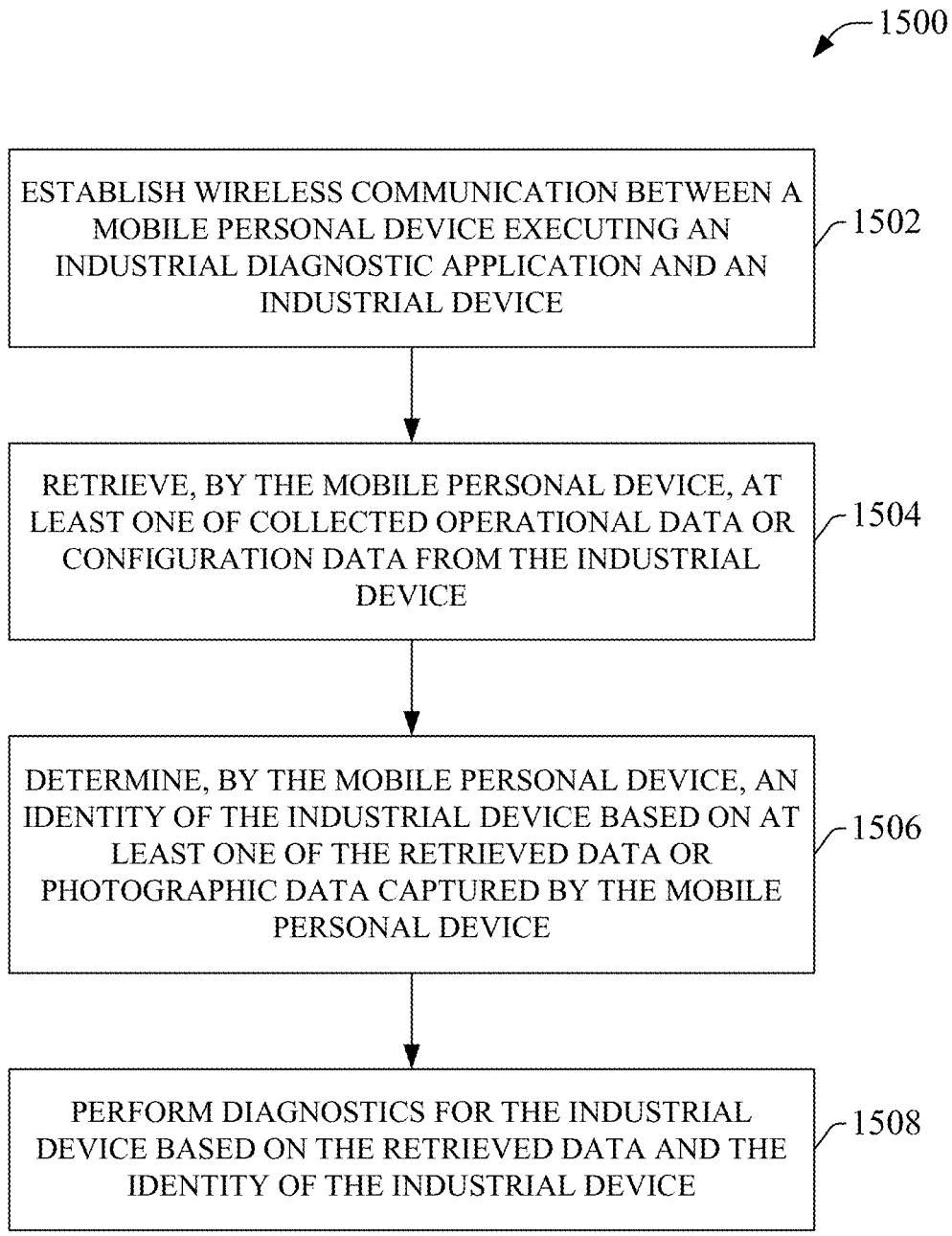
FIG. 15 is a flowchart of an example methodology for performing diagnostics on an industrial device using a mobile personal device.

FIG. 15 illustrates an example methodology for performing diagnostics on an industrial device using a mobile personal device. Initially, at 1502, wireless communication (e.g., Bluetooth, NFC, etc.) is established between a mobile personal device (e.g., a mobile phone, a tablet computer, wearable computer, etc.) and an industrial device. The mobile personal device may be running an industrial diagnostic application for retrieving and/or analyzing operational or configuration data retrieved from industrial devices. At 1504, the mobile personal device retrieves at least one of collected operational data or configuration data from the industrial device. At 1506, the mobile personal device determines an identity of the industrial device based on at least one of the data retrieved at step 1504 or photographic data captured by the mobile personal device (e.g., using techniques described above in connection with FIG. 12). At 1508, diagnostics for the industrial device are performed based on the data retrieved at step 1504 and the identity of the industrial device determined at step 1506. In some embodiments, the diagnostics can be performed locally by the mobile personal device. Alternatively, the mobile device can send the data collected at steps 1504 and 1506 to a remote analysis service (e.g., a web-based or cloud-based analysis service) for remote analysis, and the results of such analysis can be sent to the mobile device and rendered on the device's display screen.

Figure 16:
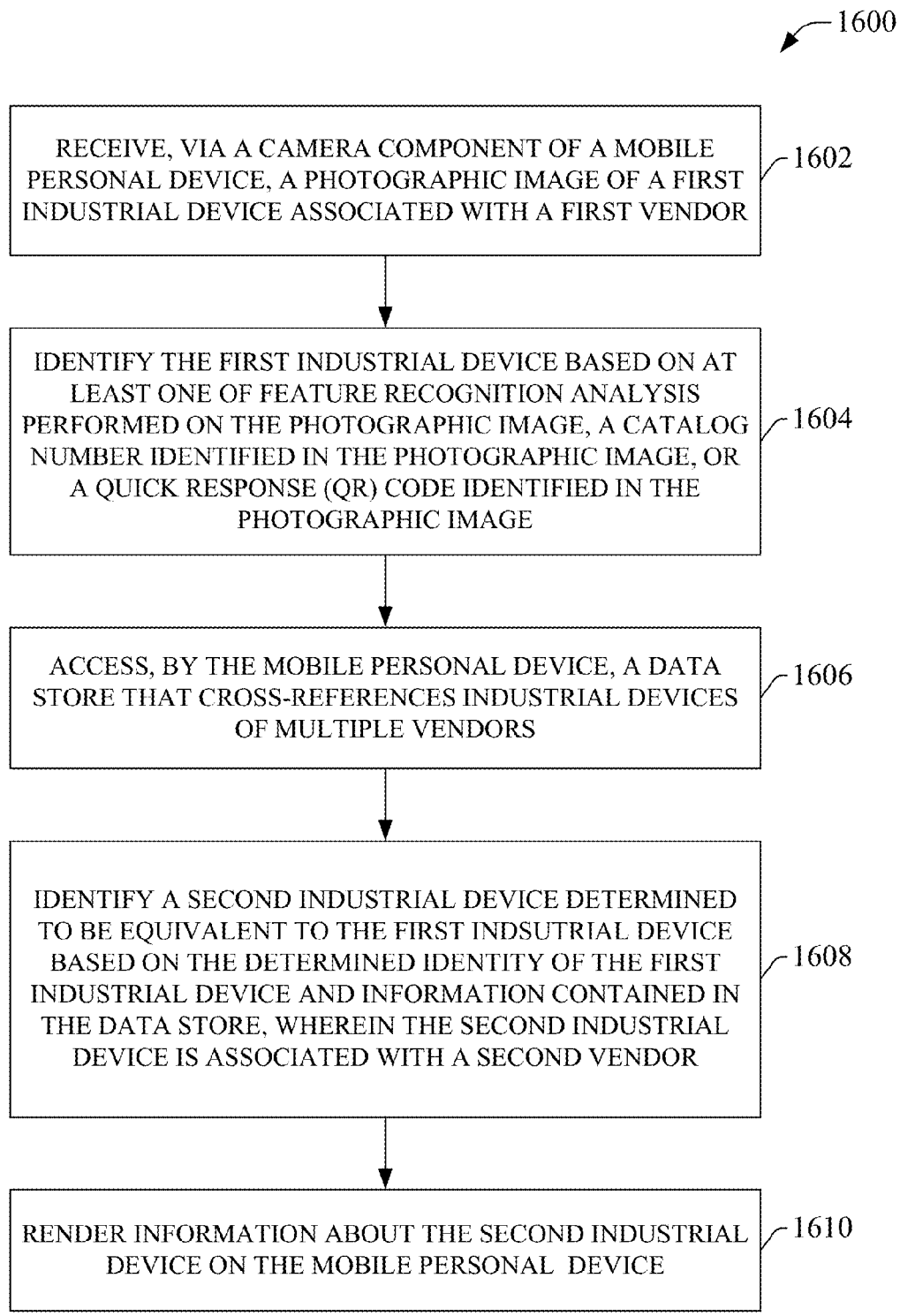
FIG. 16 is a flowchart of an example methodology for using a mobile personal device to identify one or more equivalent replacement devices for an industrial device.

FIG. 16 illustrates an example methodology for using a mobile personal device to identify one or more equivalent replacement devices for an industrial device. Initially, at 1602, a photographic image of a first industrial device associated with a first vendor is received via a camera component of a mobile personal device. The photographic image can be generated, for example, by taking a photograph of the first industrial device using the mobile device's integrated camera. At 1604, the first industrial device is identified based on the photographic image. The first industrial device can be identified based on one or more of feature recognition analysis performed on the photographic image, a catalog number identified in the photographic image, or a QR code or other translatable code identified in the photographic image.

At 1606, the mobile personal device accesses a data store that cross-references functionally equivalent industrial devices across multiple vendors. This data store can be stored locally on the mobile device, or remotely on web-based or cloud-based storage. At 1608, a second industrial device determined to be equivalent to the first industrial device is identified based on the identity of the first device determined at step 1604 and information contained in the data store. The second industrial device may be associated with a second vendor that is different than the first vendor. At 1610, information about the second industrial device is rendered on the display screen of the mobile personal device. This information can include, for example, an identity (e.g., vendor and/or model or catalog number) of the second industrial device, a description of the second industrial device, contact information for local vendors who may have the second industrial device available for sale, or other such information.

Figure 17:
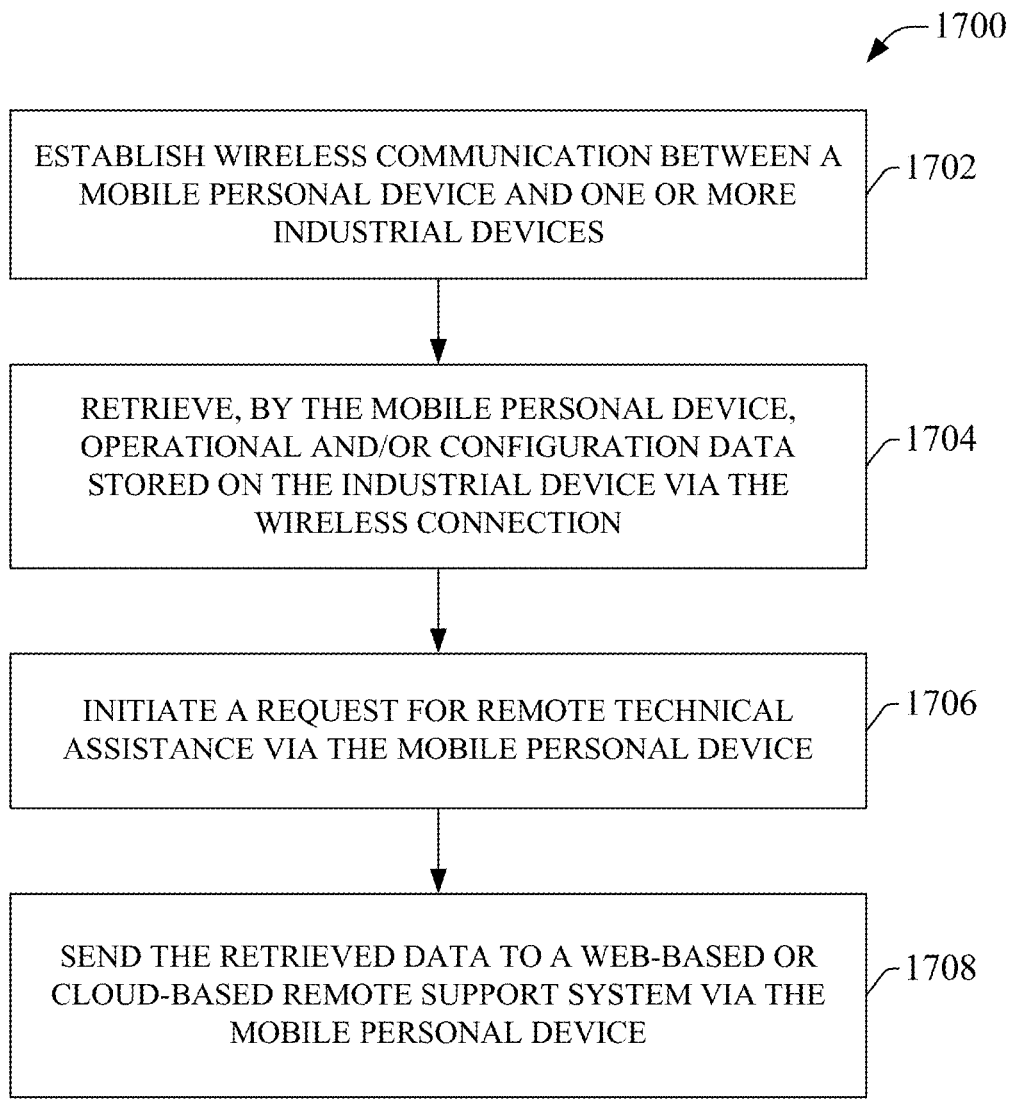
FIG. 17 is a flowchart of an example methodology for initiate remote technical support for an industrial device using a mobile personal device.

FIG. 17 illustrates an example methodology for initiate remote technical support for an industrial device using a mobile personal device. Initially, at 1702, wireless communication (e.g. Bluetooth, NFC, etc.) is established between a mobile personal device and one or more industrial devices. At 1704, the mobile personal device retrieves operational, configuration, or log data stored on the industrial device via the wireless connection. At 1706, a request for remote technical assistance is initiated via the mobile personal device (e.g., through interaction with a remote support graphical interface rendered on the mobile device's display screen). At 1708, the mobile device sends the data retrieved at step 1704 to a web-based or cloud-based remote support system for viewing and analysis by a remote technical support entity.

Figure 18:
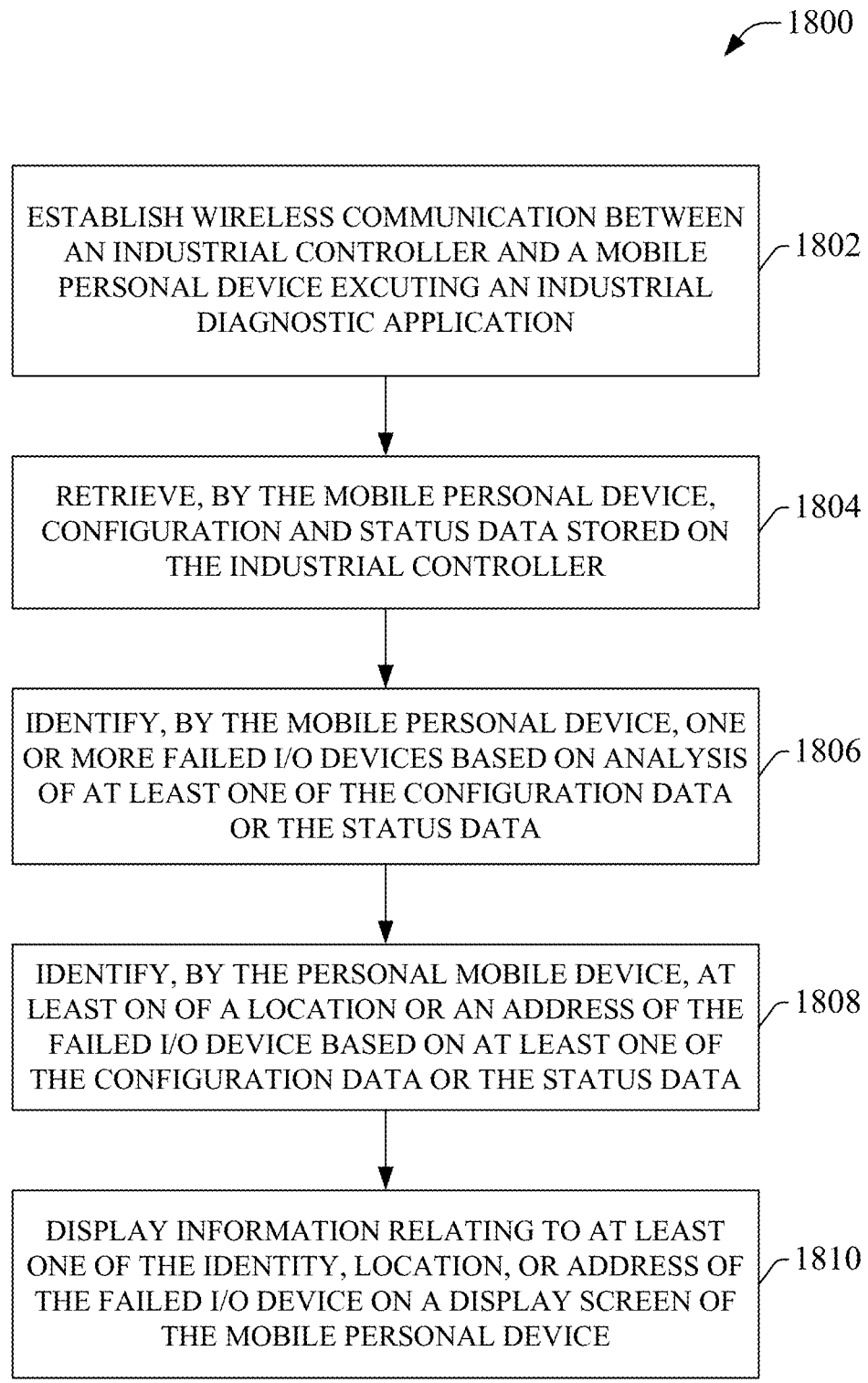
FIG. 18 is a flowchart of an example methodology for identifying and locating a failed I/O device using a mobile personal device.

FIG. 18 illustrates an example methodology for identifying and locating a failed I/O device using a mobile personal device. Initially, at 1802, wireless communication (e.g., Bluetooth, NFC, etc.) is established between an industrial controller and a mobile personal device (e.g., a mobile phone, a tablet computer, a wearable computer, etc.) executing an industrial diagnostic application. At 1804, configuration and status data stored in the industrial controller is retrieved by the mobile personal device via the wireless connection. At 1806, the mobile personal device identifies one or more failed I/O devices based on analysis of the configuration data and/or the status data retrieved at step 1804. At 1808, the personal mobile device identifies at least one of a location or an address of the failed I/O device based on the configuration and/or status data. At 1810, information relating to at least one of the identity, location, or address of the failed I/O device is displayed on a display screen of the mobile personal device.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
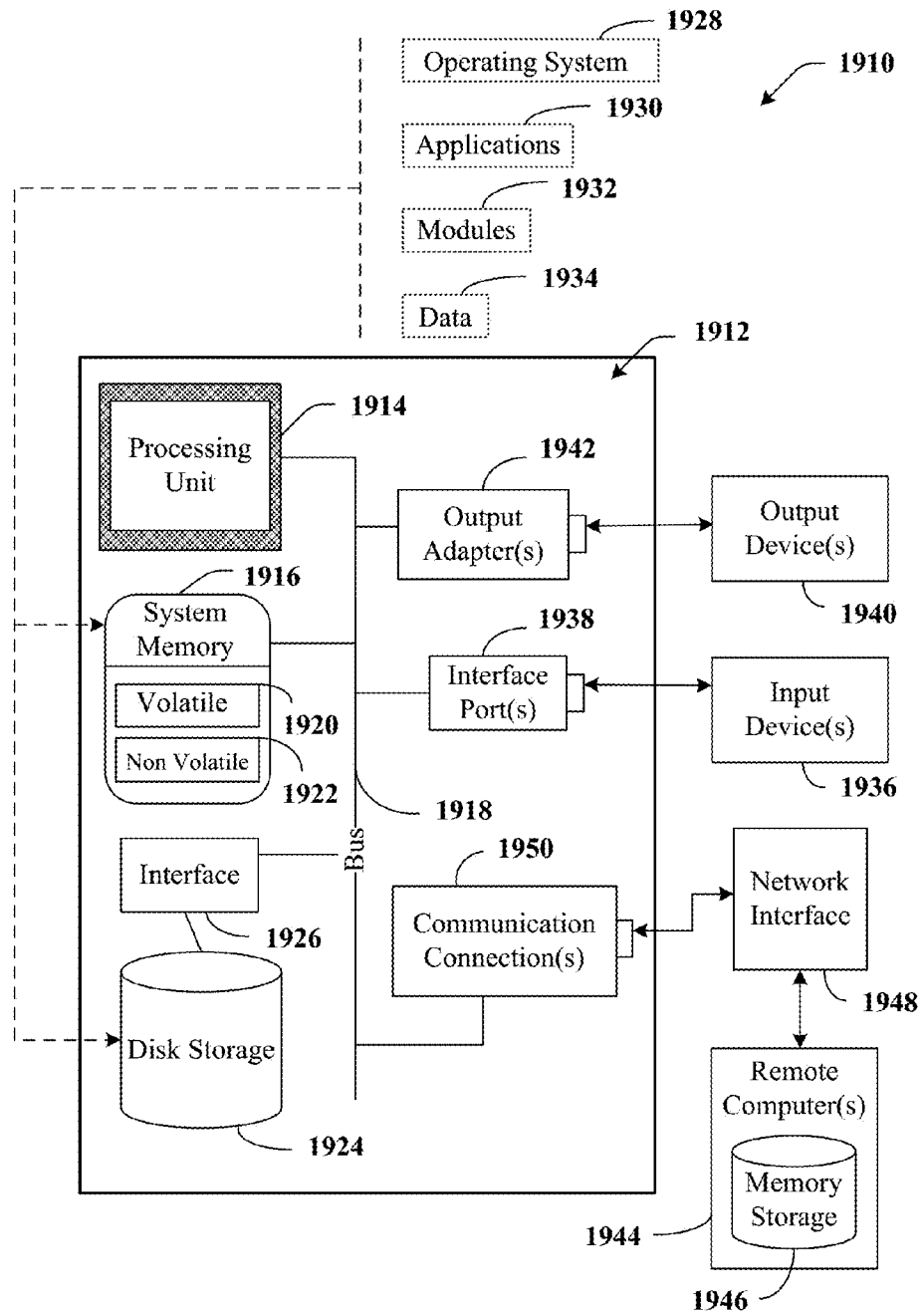
FIG. 19 is an example computing environment.
Figure 20:
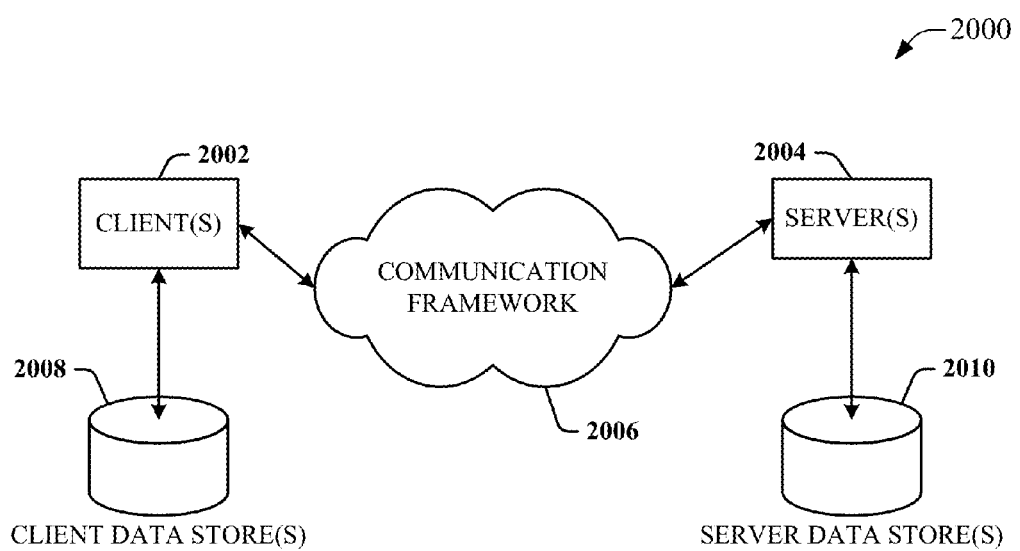
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/nonvolatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1640 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A mobile device, comprising:
   a memory that stores computer-executable components;
   a processor, operatively coupled to the memory, that executes the computer-executable components, the computer-executable components comprising:
   a wireless interface component configured to send and receive data over a wireless network;
   a video component configured to capture a video of an industrial device; and
   an industrial application component configured to identify a blinking sequence of a light emitting diode (LED) of the industrial device contained in the video, and identify an error code that corresponds to the blinking sequence of the LED from respective blink sequences associated with error codes in at least one of a local data store or a remote data store.

2. The mobile device of claim 1, wherein the-industrial application component is further configured to establish a wireless connection between the mobile device and the industrial device using the wireless interface component, and to retrieve data from the industrial device via the wireless connection.

3. The mobile device of claim 1, wherein the industrial application component is further configured to identify a model number of the industrial device based upon at least one physical attribute of the industrial device detected in the video, and to retrieve information about the industrial device from a data store based on the model number.

4. The mobile device of claim 3, wherein the data store is one of stored on a local memory of the mobile device or located on a remote cloud platform, and the information about the industrial device comprises at least one of an identity of the industrial device, a description of the industrial device, technical documentation for the industrial device, recommended device settings for the industrial device, or identification of an equivalent device capable of replacing the industrial device.

5. The mobile device of claim 3, wherein the industrial application component is further configured to identify the error condition that corresponds to the blinking sequence of the LED based on the model number.

6. The mobile device of claim 2, wherein the data comprises at least one of configuration data representing one or more configuration settings of the industrial device, log data collected by and stored on the industrial device, status information for the industrial device, or diagnostic data for the industrial device.

7. The mobile device of claim 2, wherein the industrial application component is further configured to write input data to one or more data registers of the industrial device via the wireless connection, wherein the input data is entered into the mobile device via an interface screen.

8. The mobile device of claim 7, wherein the input data comprises at least one of a configuration parameter value for the industrial device or a command signal that instructs the industrial application to perform an operation.

9. The mobile device of claim 7, wherein the industrial application component is further configured to verify an identity based on biometric information entered into the mobile device, and to deny an instruction to write the input data to the one or more data registers of the industrial device in response to a determination that the biometric information does not correspond to an authorized identity.

10. The mobile device of claim 2, wherein the industrial application component is further configured to route the data to a cloud-based remote technical support system, and to receive at least one of technical support information or device configuration data from the remote technical support system based on analysis of the data.

11. The mobile device of claim 1, wherein the industrial application component is further configured to detect a wireless beacon signal transmitted by the industrial device and determine a failed state of the industrial device based upon the wireless beacon signal.

12. The mobile device of claim 11, wherein the industrial application component is further configured to determine a location of the industrial device relative to the mobile device based upon the wireless beacon signal and present directional information on a display of the mobile device to the location of the industrial device.

13. A method, comprising:
establishing, by a mobile electronic device including a process, a wireless connection with an industrial device;
capturing, by the mobile electronic device, a video of the industrial device using a video camera integrated with the mobile electronic device;
identifying, by the mobile electronic device, a blinking sequence of a light emitting diode (LED) of the industrial device contained in the video;
identifying, by the mobile electronic device, an error condition that corresponds to the blinking sequence of the LED from respective blink sequences associated with error conditions in at least one of a local data store or a remote data store; and
rendering the error condition on a display screen of the mobile electronic device.

14. The method of claim 13, wherein the mobile electronic device is at least one of a phone or a tablet computer, and the establishing the wireless connection comprises establishing a near field communication connection.

15. The method of claim 13, further comprising:
identifying, by the mobile electronic device, a model number of the industrial device based upon at least one physical attribute of the industrial device detected in the video; and
retrieving, by the mobile electronic device, information about the industrial device based on the model number.

16. The method of claim 15, wherein the identifying the error condition is further based on the model number of the industrial device.

17. The method of claim 13, further comprising detecting, by the mobile electronic device, a wireless beacon signal transmitted by the industrial device, and determining, by the mobile electronic device, a failed state of the industrial device based upon the wireless beacon signal.

18. A non-transitory computer-readable medium having stored thereon computer-executable instructions that, in response to execution, cause a mobile device including a processor to perform operations, comprising:
establishing a wireless connection with an industrial device;
capturing a video of the industrial device using a video camera integrated with the mobile electronic device;
identifying a blinking sequence of a light emitting diode (LED) of the industrial device contained in the video;
identifying an error condition that corresponds to the blinking sequence of the LED from respective blink sequences associated with error conditions in at least one of a local data store or a remote data store; and
displaying the error condition on a display interface of the mobile electronic device.

19. The non-transitory computer-readable medium of claim 18, wherein the operations further comprise:
identifying a device identification number of the industrial device based upon at least one physical attribute of the industrial device detected in the video; and
causing the mobile electronic device to retrieve, from a local or remote data store, information about the industrial device based on the device identification number.

20. The non-transitory computer-readable medium of claim 19, wherein the identifying the error condition is further based on the model number of the industrial device.

* * * * *